(12) United States Patent  
Seyama

(10) Patent No.: US 9,831,959 B2  
(45) Date of Patent: Nov. 28, 2017

(54) ARITHMETIC APPARATUS TO CALCULATE INTERFERENCE SUPPRESSION PARAMETER FOR RADIO DEVICE, BASE STATION APPARATUS, AND RADIO TERMINAL DEVICE

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/439,651

(22) Filed: Feb. 22, 2017

(65) Prior Publication Data

US 2017/0272177 A1  Sep. 21, 2017

(30) Foreign Application Priority Data

Mar. 15, 2016 (JP) ................. 2016-051560

(51) Int. Cl.
| | |
|---|---|
| *H04B 15/00* | (2006.01) |
| *H04W 24/08* | (2009.01) |
| *H04W 88/02* | (2009.01) |
| *H04W 88/08* | (2009.01) |

(52) U.S. Cl.  
CPC ............ *H04B 15/00* (2013.01); *H04W 24/08* (2013.01); *H04W 88/02* (2013.01); *H04W 88/08* (2013.01)

(58) Field of Classification Search  
CPC . H04B 15/00; H04B 7/06; H04B 7/26; H04B 7/10; H04W 24/08; H04W 88/02; H04W 88/08; H04J 15/00  
See application file for complete search history.

(56) References Cited

U.S. PATENT DOCUMENTS

| | | | | |
|---|---|---|---|---|
| 7,421,041 B2* | 9/2008 | Khandekar | ............ | H04L 1/005 375/316 |
| 8,149,957 B2* | 4/2012 | Oh | ........................ | H04L 5/0048 375/260 |
| 8,611,227 B2* | 12/2013 | Gore | .................. | H04B 7/15585 370/241 |

(Continued)

FOREIGN PATENT DOCUMENTS

JP   2007-215045 A   8/2007

OTHER PUBLICATIONS

Yamaguchi et al, Channel Prediction Techniques for a Multi-User MIMO System in Time-Varying Environments, IEICE Trans. Commun., vol. E97-B, No. 12, pp. 2747-2755, Dec. 2014.

*Primary Examiner* — Pablo Tran  
(74) *Attorney, Agent, or Firm* — Arent Fox LLP

(57) ABSTRACT

An arithmetic apparatus to calculate an interference suppression parameter for a radio device includes a predictive value calculator, a predictive error calculator, and an interference suppression parameter calculator. The predictive value calculator calculates a predictive value for a radio communication channel between radio devices. The predictive error calculator calculates a predictive error in the radio communication channel based on the predictive value. The interference suppression parameter calculator calculates an interference suppression parameter available to suppress an interference in the radio communication channel, the interference suppression parameter being orthogonal to the predictive value and the predictive error in a vector space.

9 Claims, 21 Drawing Sheets

(56) References Cited

U.S. PATENT DOCUMENTS

| | | | | |
|---|---|---|---|---|
| 8,660,225 B2* | 2/2014 | Liu | ...................... | H04B 7/0634 |
| | | | | 375/260 |
| 9,265,049 B2* | 2/2016 | Palanki | .................. | H04B 7/022 |
| 2003/0031278 A1* | 2/2003 | Kang | .................... | H04L 1/0055 |
| | | | | 375/341 |
| 2010/0054358 A1* | 3/2010 | Ko | ...................... | H04B 7/0639 |
| | | | | 375/267 |
| 2010/0329371 A1* | 12/2010 | Zhou | ...................... | H04L 27/28 |
| | | | | 375/260 |

* cited by examiner

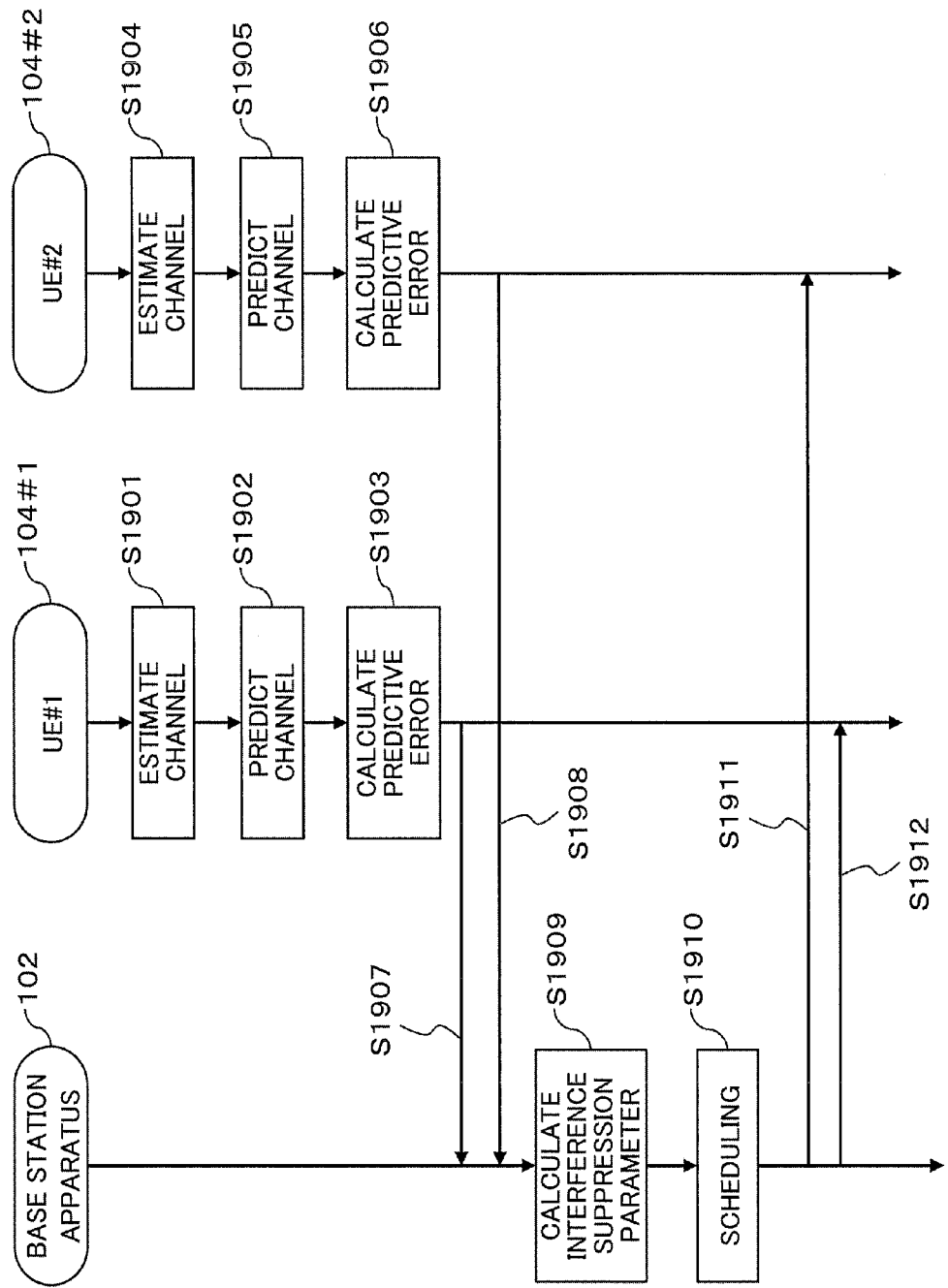

ARITHMETIC APPARATUS TO CALCULATE INTERFERENCE SUPPRESSION PARAMETER FOR RADIO DEVICE, BASE STATION APPARATUS, AND RADIO TERMINAL DEVICE

CROSS-REFERENCE TO RELATED APPLICATION

This application is based upon and claims the benefit of priority of the prior Japanese Patent Application No. 2016-051560, filed on Mar. 15, 2016, the entire contents of which are incorporated herein by reference.

FIELD

The embodiments discussed herein are related to an arithmetic apparatus to calculate an interference suppression parameter for a radio device, a radio communication system, a method of suppressing interferences of a radio communication system, a base station apparatus, and a radio terminal device.

BACKGROUND

There are multi-user multiple-input multiple-output (MIMO) technologies for simultaneously transmitting data to a plurality of user equipments (UEs) from a base station including a plurality of transmitting antennas. In the multi-user MIMO, inter-UE orthogonalization technologies such as zero forcing (ZF) applying transmission weights to transmitting data at a transmitter side so as not to cause an interference between UEs or block diagonalization are known. The transmission weights are determined based on the channel state of a radio communication channel between a base station and UEs. In addition, there are technologies for predicting a channel at a data receiving time point and calculating a transmission weight by using a predicted channel state.

RELATED ART DOCUMENT LIST

Patent Document 1: JP 2007-215045 A
Non-Patent Document 1: K. Yamaguchi, H. P. Bui, Y. Ogawa, T. Nishimura and T. Ohgane, "Channel prediction techniques for a multi-user MIMO system in time-varying environments" IEICE Trans. Commun., vol. E97-B, no. 12, pp. 2747-2755, December 2014.

However, in a case where a UE moves or a radio wave scattering body disposed on the periphery of a UE moves, fading occurs. According to the occurrence of fading and the like, the channel state changes from time to time. In a case where there is a difference between a channel state at a time point at which the transmission weight is calculated and a channel state at a time point at which actual data is received in accordance with a change of the channel state, the orthogonalization between UEs is not maintained, an interference occurs between the UEs, whereby the performance of radio communication is degraded.

SUMMARY

According to one aspect, an arithmetic apparatus to calculate an interference suppression parameter for a radio device includes a predictive value calculator, a predictive error calculator, and an interference suppression parameter calculator. The predictive value calculator calculates a predictive value for a radio communication channel between radio devices. The predictive error calculator calculates a predictive error in the radio communication channel based on the predictive value. The interference suppression parameter calculator calculates an interference suppression parameter available to suppress an interference in the radio communication channel, the interference suppression parameter being orthogonal to the predictive value and the predictive error in a vector space.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a sequence diagram of communication in the radio communication system according to Embodiment 5.

DESCRIPTION OF EMBODIMENTS

Hereinafter, a plurality of embodiments will be described with reference to the drawings.

Embodiment 1

Figure 1:
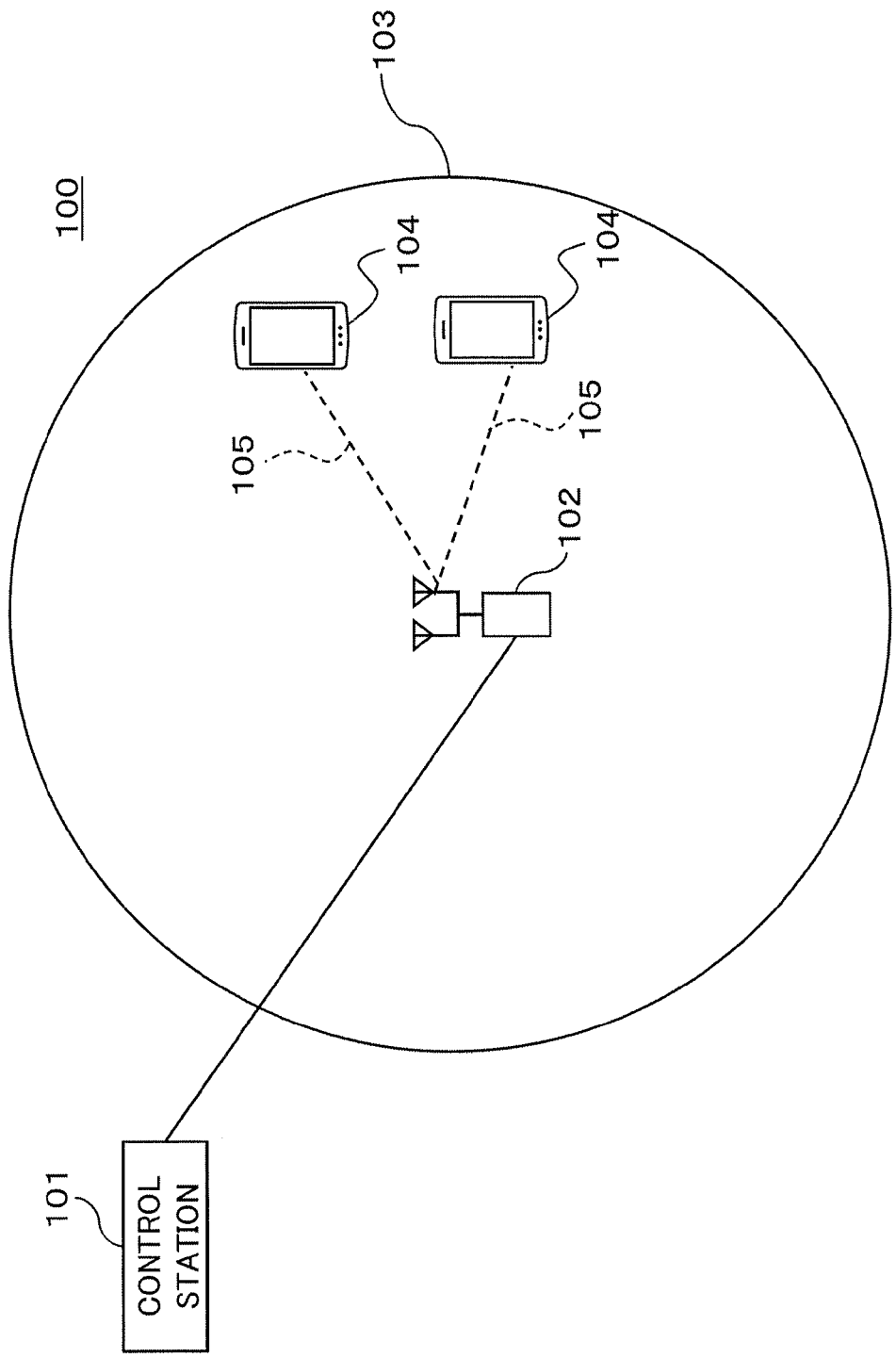
FIG. 1 is a diagram that illustrates a whole radio communication system according to Embodiment 1.

FIG. 1 is a diagram that illustrates a whole radio communication system 100 according to an embodiment. The radio communication system 100 includes a control station 101, a base station 102, and a UE 104. The base station 102 is connected to the control station 101 through a wire circuit such as an optical circuit or a radio link such as a microwave link, and the control station 101 controls radio communication of the base station 102. As such control, the control station 101, for example, controls radio signals transmitted or received by the base station 102 as a high-order device of the base station 102. In addition, the control station 101 is connected to a core network and is a communication interface between the core network and the base station 102.

The base station 102 includes antennas and transmits and receives radio signals used for communicating with the UE 104. A communication range in which signals are transmitted or received by the antennas included in the base station 102 will be referred to as a radio area 103. When the UE 104 is positioned in the radio area 103, radio communication between the UE 104 and the base station 102 can be performed through a radio communication channel 105.

There are cases where the base station 102 is called a remote radio head (RRH) or a transmission point (TP). The radio area 103 may be called a cell, a macro cell, a micro cell, a pico cell, a femto cell, a home cell, or the like.

The UE 104 is a device that performs radio communication with the base station 102 and is one type of radio device. The UE 104 may be called as a "radio communication terminal", a "mobile station (MS)", a "user terminal", a "subscriber station".

In FIG. 1, a foam is illustrated in which the control station 101 and the base station 102 are separate from each other. However, the embodiment is not limited such a foam, but the control station 101 and the base station 102 may be arranged in one casing or inside a plurality of casings that are physically adjacent to each other. There are cases where an apparatus included in the one casing or the plurality of casings may be called a base station apparatus. In addition, there are cases where the base station apparatus may be called Node-B or an evolved Node-B (eNB).

Figure 2:
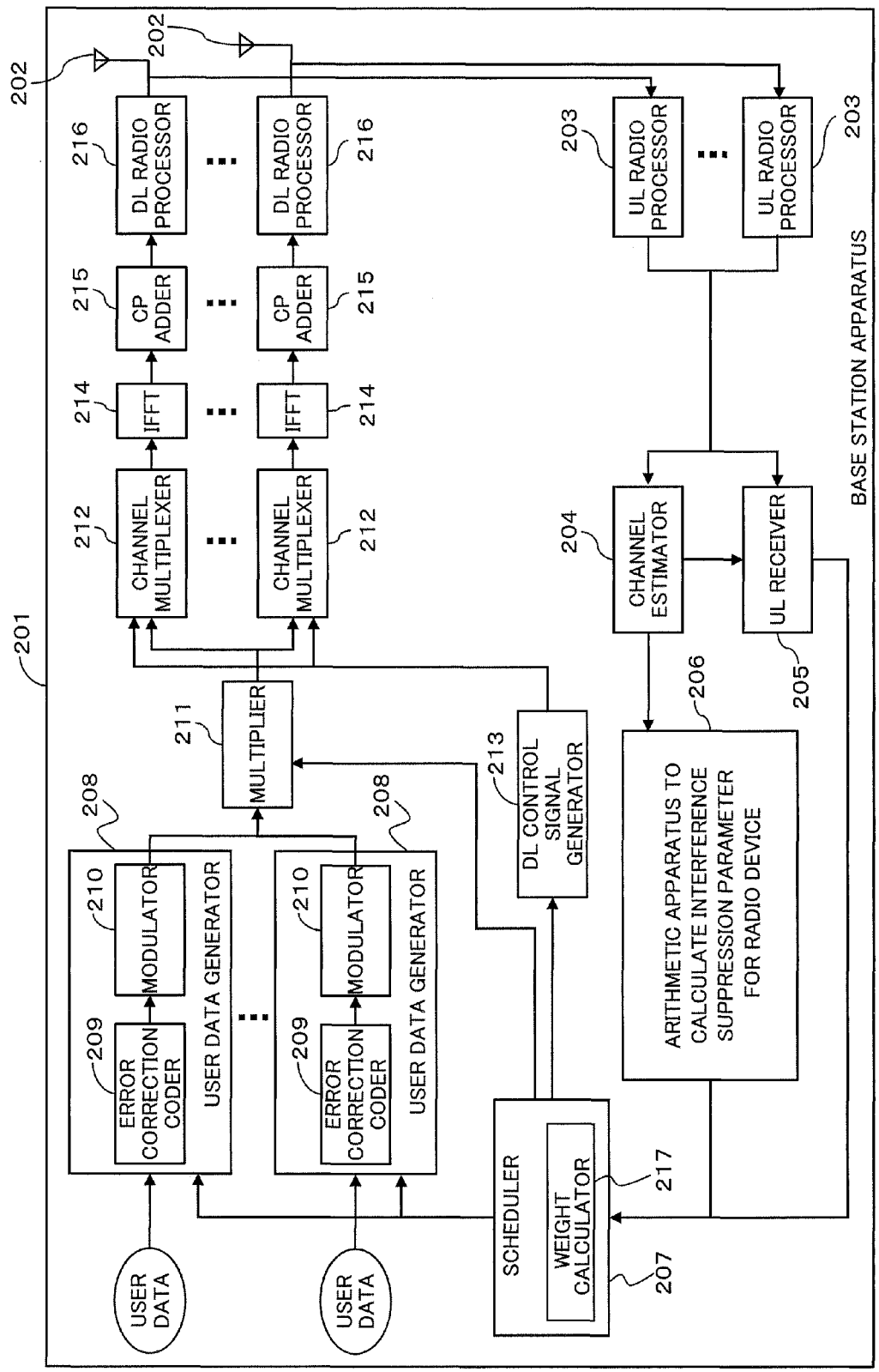
FIG. 2 is a functional block diagram of a base station apparatus of the radio communication system according to Embodiment 1.

FIG. 2 is a functional block diagram of the base station apparatus 201. The base station apparatus 201 includes antennas 202, uplink (UL) radio processors 203, a channel estimator 204, a UL receiver 205, an arithmetic apparatus 206 to calculate an interference suppression parameter for a radio device, a scheduler 207, and a user data generator 208. The scheduler 207 includes a weight calculator 217. The user data generator 208 includes an error correction coder (ECC) 209 and a modulator 210. In addition, the base station apparatus 201 includes a multiplier 211, channel multiplexers 212, a downlink (DL) control signal generator 213, and inverse fast Fourier transformations (IFFT) 214. Furthermore, the base station apparatus 201 includes cyclic prefix (CP) adders 215 and DL radio processors 216.

In a case where the control station 101 and the base station 102 are realized as separate bodies, there are various forms based on whether the functions of the base station apparatus 201 are distributed to the control station 101 or the base station 102. For example, among the functions of the base station apparatus 201, the functions of the antennas 202, the UL radio processors 203, and the DL radio processors 216 are distributed to the base station 102, and the functions of the other units of the base station apparatus 201 are distributed to the control station 101.

The antenna 202 transmits radio signals output from the DL radio processor 216 and outputs received radio signals to the UL radio processor 203.

The UL radio processor 203 performs processes of radio signals output from the antenna 202. For example, the UL radio processor 203 performs a frequency conversion and an analog-to-digital (A/D) conversion of a radio signal and converts the radio signal into a baseband signal.

The channel estimator 204 estimates a current channel state of a radio communication channel between the current base station apparatus 201 and the UE 104 by using a baseband signal output by the UL radio processor 203. For example, the channel estimator 204 estimates a current uplink channel state by using one or both of an SRS and a D-RS used for measuring the channel quality transmitted by the UE 104. Here, the SRS is an abbreviation of a sounding reference signal, and the D-RS is an abbreviation of a demodulation reference signal. In addition, by assuming a time division duplex (TDD) system, based on the reciprocity between a downlink channel and an uplink channel, an estimated value of the uplink channel is assumed to be applicable as an estimated value of the downlink channel. However, the invention is not limited to the TDD system but can be applied also to an FDD system, for example, by configuring a UE to feed the channel back to the base station.

The UL receiver 205 performs a process of receiving a baseband signal that is output by the UL radio processor 203. For example, the UL receiver 205 extracts one or more of response information and a no-response information for an uplink data signal transmitted from the UE 104 and a downlink data signal transmitted to the UE 104 and channel state information. The channel state information is information relating to a result of an estimation of the channel state, which is performed by the UE 104, using a signal used for estimating the channel state transmitted by the base station apparatus 201.

The arithmetic apparatus 206 to calculate an interference suppression parameter for a radio device calculates an interference suppression parameter for a radio communication channel between the base station 102 and the UE 104 based on the channel state estimated by the channel estimator 204. The interference suppression parameter is a parameter, when a signal is transmitted to the UE 104, used for calculating a weight (transmission weight) not causing a signal transmitted to another UE to interfere with the signal.

The scheduler 207 determines a combination of UEs to which a radio signal of downlink data is transmitted and determines a weight and a modulation and coding scheme (MCS) for each radio communication terminal within the determined combination. The combination of UEs, the weight, and the MCS that have been determined are directed to the user data generator 208, the multiplier 211, and the DL control signal generator 213. The scheduler 207 determines the weight by using an estimation result of channel states acquired by one or both of the channel estimator 204 and the UL receiver 205 and the interference suppression parameter output by the arithmetic apparatus 106 to calculate an interference suppression parameter for a radio device. As will be described later, the weight is calculated by the weight calculator 217.

The user data generator 208 generates user data for transmission for a UE directed from the scheduler 207 based on user data transmitted from the core network and the like. The error correction coder (ECC) 209 performs an error correction coder (ECC) process of user data at a coding ratio directed for the UE that is directed from the scheduler 207. The modulator 210 performs modulation of user data for which the error correction coder (ECC) process has been performed by using a modulation system directed from the scheduler 207, thereby generating user data for transmission.

The multiplier 211 multiplies the user data for transmission, which is output from the user data generator 208, by the weight determined by the scheduler so as to cause a beam to be formed when a radio signal is transmitted from the antenna 202. The beam is famed to be directed toward a null for UEs other than a UE that is the destination of the radio signal.

The DL control signal generator 213 generates control signals of presence/absence of data allocation, an MCS, and the like of each UE based on a direction from the scheduler 207.

The channel multiplexer 212 multiplexes the user data for transmission that has been multiplied by the weight by the multiplier 211 and the control signal generated by the DL control signal generator 213.

The IFFT 214 transforms a change of a signal output by the channel multiplexer 212 in the frequency domain into a change in the time domain by performing an inverse Fourier transformation for the signal multiplexed by the channel multiplexer 212, thereby converting the signal into a valid symbol of an OFDM symbol. Here, the OFDM is an abbreviation of orthogonal frequency-division multiplexing.

The CP adder 215 adds a cyclic prefix to the valid symbol converted by the IFFT 214, thereby generating an OFDM symbol.

The DL radio processor 216 performs a conversion into a radio frequency and a digital-to-analog (D/A) conversion for the OFDM symbol and outputs a radio signal toward the antenna 202.

The functions of the base station apparatus 201 of which the functional block diagram is illustrated in FIG. 2 can be realized by a combination of the control station 101 and the base station 102. For example, by including the antenna 202, the DL radio processor 216, and the UL radio processor 203 in the base station 102 and including the other units in the control station 101, the functions of the base station apparatus 201 can be realized.

Figure 3:
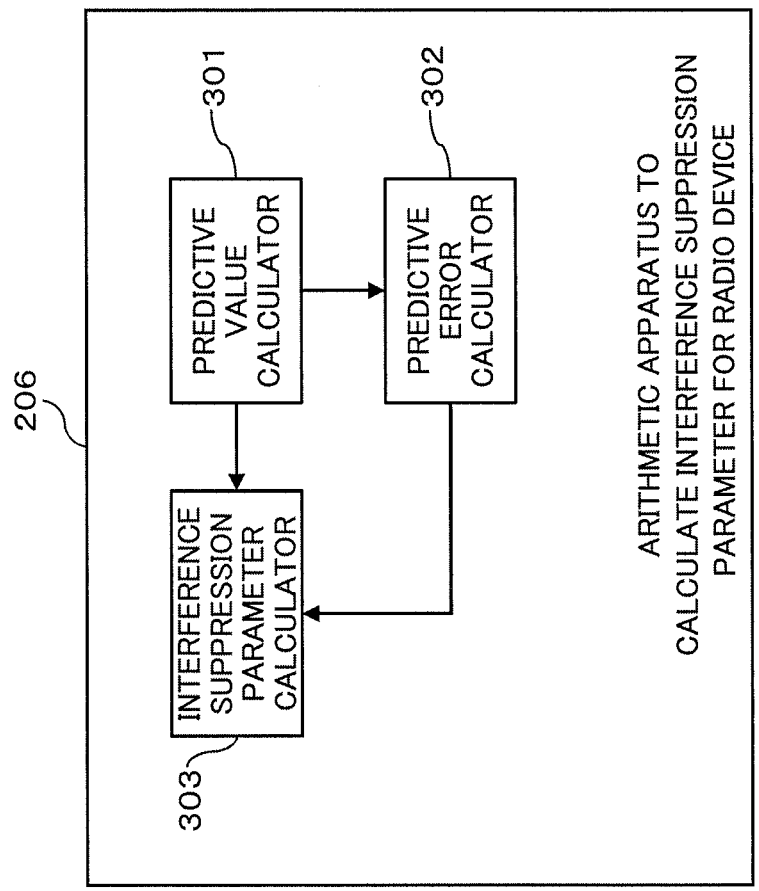
FIG. 3 is a functional block diagram of an arithmetic apparatus to calculate an interference suppression parameter for a radio device included in the base station apparatus of the radio communication system according to Embodiment 1.

FIG. 3 is a functional block diagram of the arithmetic apparatus 206 to calculate an interference suppression parameter for a radio device. The arithmetic apparatus 206 to calculate an interference suppression parameter for a radio device includes a predictive value calculator 301, a predictive error calculator 302, and an interference suppression parameter calculator 303.

The predictive value calculator 301 calculates a predictive value for a radio communication channel between base station apparatuses. The radio communication channel between base station apparatuses is a radio communication channel between the base station apparatus 201 and the UE 104. The predictive value for a radio communication channel between base station apparatuses is a predictive value of a future state of the radio communication channel of a case where the state of the radio communication channel between radio devices changes according to an elapse of time. For example, the predictive value calculator 301 can predict the channel state of a radio communication channel between radio devices based on a channel state estimated by the channel estimator 204. For example, the predictive value calculator 301 may be configured to store a channel state estimated during a past predetermined time interval by the channel estimator 204 and perform a prediction of the channel state based on the stored channel state. In other words, the channel state is acquired and stored in a time series.

The predictive error calculator 302 calculates a predictive error for a radio communication channel between radio devices based on the predictive value calculated by the predictive value calculator 301. For example, the predictive error calculator 302 can calculate a predictive error in a predictive value calculated by the predictive value calculator 301 by comparing a predictive value for a communication channel calculated by the predictive value calculator 301 with the channel state estimated by the channel estimator 204. In order to calculate a predictive error, as will be described later, for example, a principal component analysis in statistics may be used.

The interference suppression parameter calculator 303 calculates an interference suppression parameter of a radio communication channel. The interference suppression parameter of a radio communication channel is calculated such that the predictive value calculated by the predictive value calculator 301 and the predictive error calculated by the predictive error calculator 302 are orthogonal to each other in a vector space. The vector space is a space that represents a status of a radio communication channel. For example, in a case where the predictive error is calculated using calculation of the principal component analysis, the interference suppression parameter calculator calculates a parameter representing the direction of a principal component of the predictive error in the vector space.

The operations of the arithmetic apparatus 206 to calculate an interference suppression parameter for a radio device and the scheduler 207 will be described later in detail.

Figure 4:
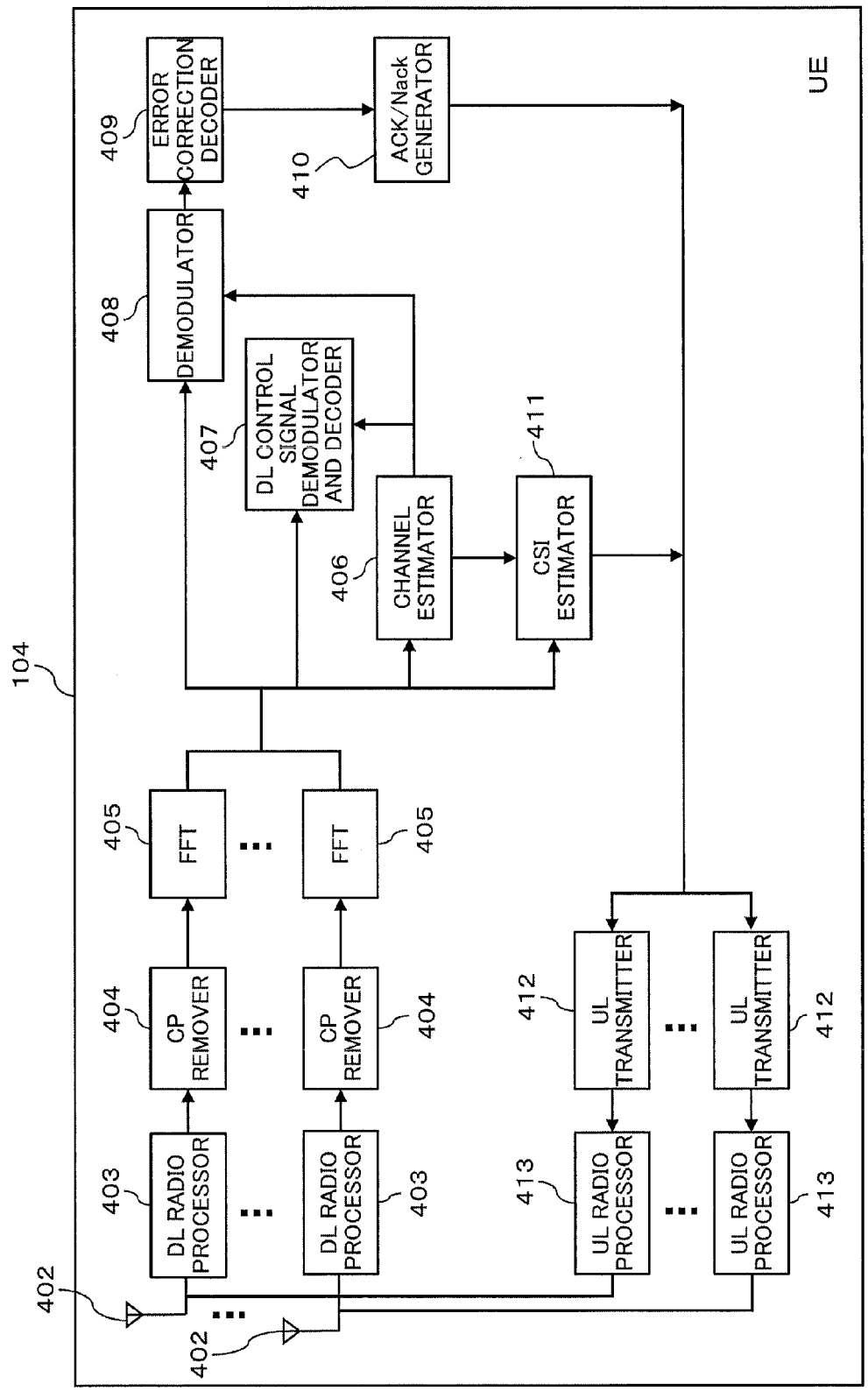
FIG. 4 is a functional block diagram of a UE of the radio communication system according to Embodiment 1.

FIG. 4 is a functional block diagram of the UE 104. The UE 104 includes antennas 402, DL radio processors 403, CP remover 404, FFTs 405, a channel estimator 406, a DL control signal demodulator and decoder 407, a demodulator 408, and an error correction decoder 409. In addition, the UE 104 includes an acknowledgement (Ack)/non-acknowledgement (Nack) generator 410, a CSI estimator 411, a UL transmitter 412, and a UL radio processor 413.

The antenna 402 outputs a received radio signal to the DL radio processor 403 and transmits a radio signal output by the UL radio processor 413.

The DL radio processor 403 performs a frequency conversion and an AD conversion of a radio signal that is received and output by the antenna and outputs a baseband signal.

The CP remover 404 removes a cyclic prefix of an OFDM symbol of the baseband signal output by the DL radio processor 403, thereby acquiring a valid symbol.

The fast Fourier transformation (FFT) 405 converts a change in the time domain into a change in the frequency domain by performing a Fourier transform of the valid symbol acquired by the CP remover 404, thereby acquiring signals of the frequency domain.

The channel estimator 406 estimates a channel state of a communication channel between the base station apparatus 201 and the UE 104 based on signals of the frequency domain acquired by the FFT 405.

The DL control signal demodulator and decoder 407 performs demodulation and decoding of a control signal among signals of the frequency domain acquired by the FFT 405. For example, the DL control signal demodulator and decoder 407 extracts presence/absence of allocation of a data signal and information of the MCS of the data signal included in the control signal through the demodulation and decoding process.

The demodulator 408 demodulates a data signal among signals of the frequency domain acquired by the FFT 405.

The error correction decoder 409 performs error correction decoding of the data signal demodulated by the demodulator 408.

The Ack/Nack generator 410 generates an Ack signal in a case where the error correction decoder 409 succeeds in error correction decoding of a data signal and generates a Nack signal in a case where the error correction decoder 409 fails in the error correction decoding of the data signal.

The CSI estimator 411 estimates channel quality information.

The UL transmitter 412 performs the error correction coder (ECC) and demodulation process for the user data of the uplink, the Ack signal and the Nack signal, the channel quality information estimated by the CSI estimator 411, and information representing the channel state estimated by the channel estimator 406.

The UL radio processor 413 performs a conversion into a radio frequency and a DA conversion for a result of the error correction coder and demodulation process performed by the UL transmitter 412 and outputs a result of the conversion to the antenna 402.

Figure 5:
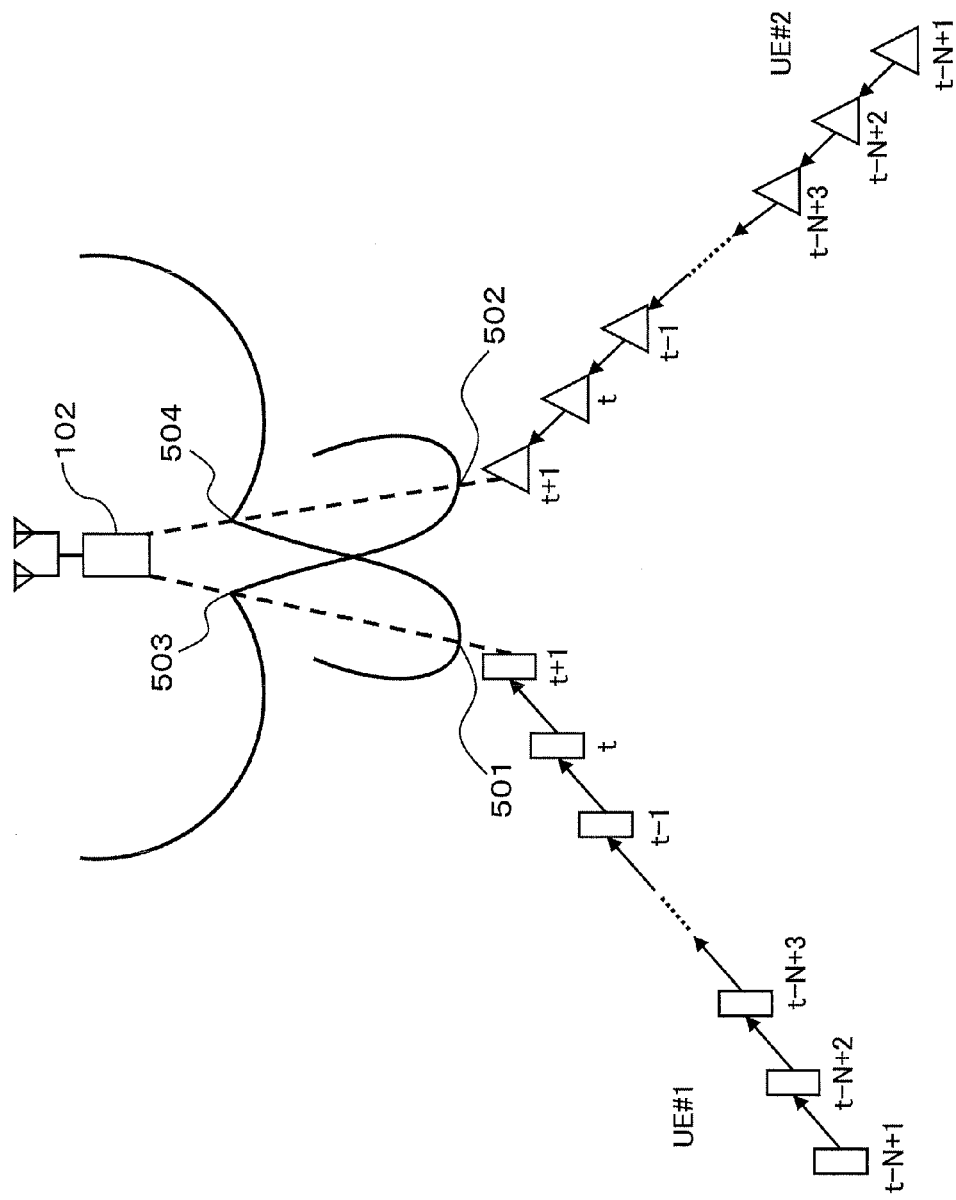
FIG. 5 is a diagram that illustrates an example of a channel prediction in the radio communication system according to Embodiment 1.

FIG. 5 is a diagram that illustrates an example of a channel prediction in the radio communication system according to an embodiment. It is assumed that a base station 102 having a part of functions of the base station apparatus 201 communicates with two UEs including UE#1 and UE#2. According to the movement of UE#1 and UE#2, the movement of an object disposed on the periphery of UE#1 and UE#2, or the like, a channel state of a radio communication channel between the base station apparatus 201 and each of UE#1 and UE#2 is changed. Here, a time point when a weight is calculated by the scheduler 207 is denoted by time t, and time when data is transmitted next will be denoted by t+1. In addition, a channel state, which is estimated by the channel estimator 204, and a channel state, which is predicted by the predictive value calculator 301, of a radio communication channel between the base station apparatus 201 and each of UE#1 and UE#2 at a past time point of N−1 are assumed to be known. For example, information relating to the estimated channel state and the predicted channel state of the communication channel at the past time point of N−1 is assumed to be stored in the base station apparatus 201.

The predictive value calculator 301 calculates a predictive value of the channel state at time "t+1" such that a null 504 of a beam 501 directed toward UE#1 is directed toward UE#2, and a null 503 of a beam 502 directed toward UE#2 is directed toward UE#1 at time "t+1". The scheduler 207 determines a weight at time "t+1" based on the predictive value.

For example, a channel vector representing a channel state of a radio communication channel between UE#1 and the base station 102 will be denoted by $h_1(t)$, and a predictive value of the channel vector of UE#1 at time "t+1" will be denoted by $\hat{h}_1(t+1)$. At this time, a transmission weight $w_2$ of UE#2 is determined to be orthogonal to $\hat{h}_1(t+1)$. When an operator of an inner product (for example, a Euclidean metric) of a vector is denoted by "·", $\hat{h}_1(t+1) \cdot w_2 = 0$. Similarly, when the transmission weight of UE#1 is denoted by $\hat{h}_2(t+1) \cdot w_1 = 0$.

In a case where the predictive value of the channel is close to that of the channel vector of an actual channel at time "t+1", an interference component of a transmission signal for UE#1 according to the transmission signal toward UE#2 is $\hat{h}_1(t+1) \cdot w_2 \approx 0$, and the degradation of the performance due to a change in the channel state can be relieved. In other words, in a case where the accuracy of the channel prediction is high (($\hat{h}_1(t+1) \approx h_1(t+1)$), $h_1(t+1) \cdot w_2 \approx 0$, and the degradation of the performance due to a change in the channel state can be relieved.

Figure 6B:
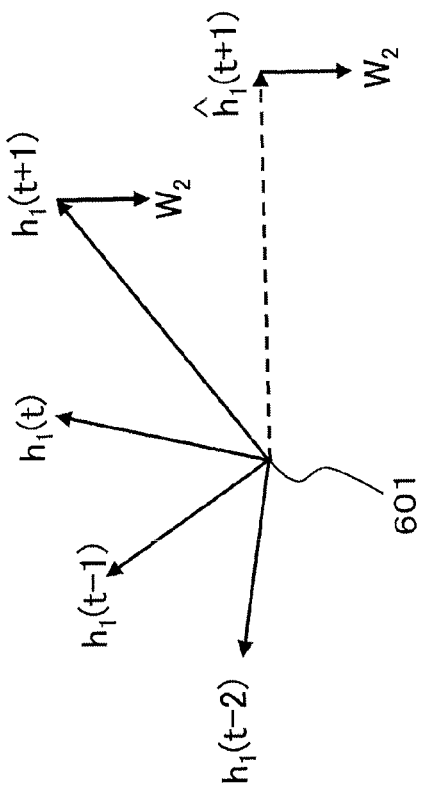
FIG. 6B is a diagram that illustrates an example of a case where a channel prediction is not favorably performed in a MIMO system.
Figure 6A:
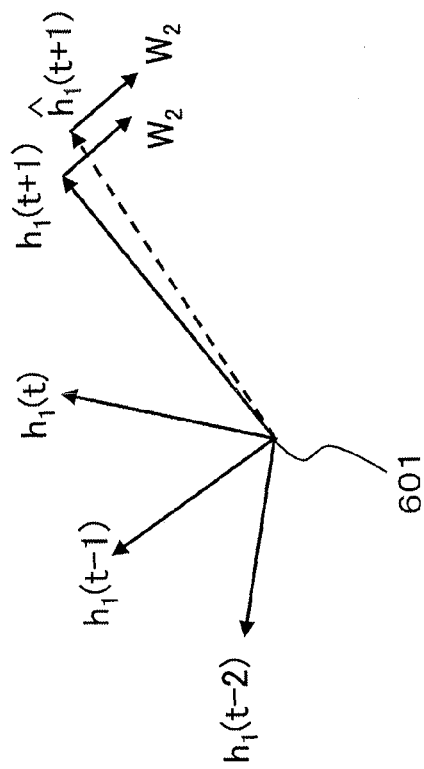
FIG. 6A is a diagram that illustrates an example of a case where a channel prediction is favorably pertained in a MIMO system.

FIG. 6A is a diagram that illustrates an example of a case where the accuracy of a channel prediction is high. According to a change in the channel state, it is assumed that the channel vector of UE#1 changes to $h_1(t-2)$, $h_1(t-1)$, $h_1(t)$, and $h_1(t+1)$ with the origin 601 as its center. At this time, based on at least $h_1(t-2)$, $h_1(t-1)$, and $h_1(t)$, $\hat{h}_1(t+1)$ is acquired by the predictive value calculator 301. Then, $w_2$ is acquired so as to satisfy $\hat{h}_1(t+1) \cdot w_2 = 0$, in other words, so as to be orthogonal to $\hat{h}_1(t+1)$. In a case where $\hat{h}_1(t+1) \approx h_1(t+1)$, it can be determined that $h_1(t+1)$ and $w_2$ are substantially orthogonal to each other.

Meanwhile, as illustrated in FIG. 6B, a case will be described in which a difference between $\hat{h}_1(t+1)$ and $h_1(t+1)$ is larger than a difference between $\hat{h}_1(t+1)$ and $h_1(t+1)$ illustrated in FIG. 6A. In such a case, since $\hat{h}_1(t+1) \neq h_1(t+1)$, also when $\hat{h}_1(t+1) \cdot w_2 = 0$, $h_1(t+1) \cdot w_2 \neq 0$. In other words, in a case where the accuracy of the channel prediction is low, the interference component of a transmission signal toward UE#1 according to a transmission signal toward UE#2 is $h_1(t+1) \cdot w_2 \neq 0$, and accordingly, the performance of the radio communication is degraded. The reason for this is that, since $h_1(t+1) \cdot w_2 \neq 0$, the transmission signal toward UE#2 interferes with the transmission signal toward UE#1.

Figure 7:
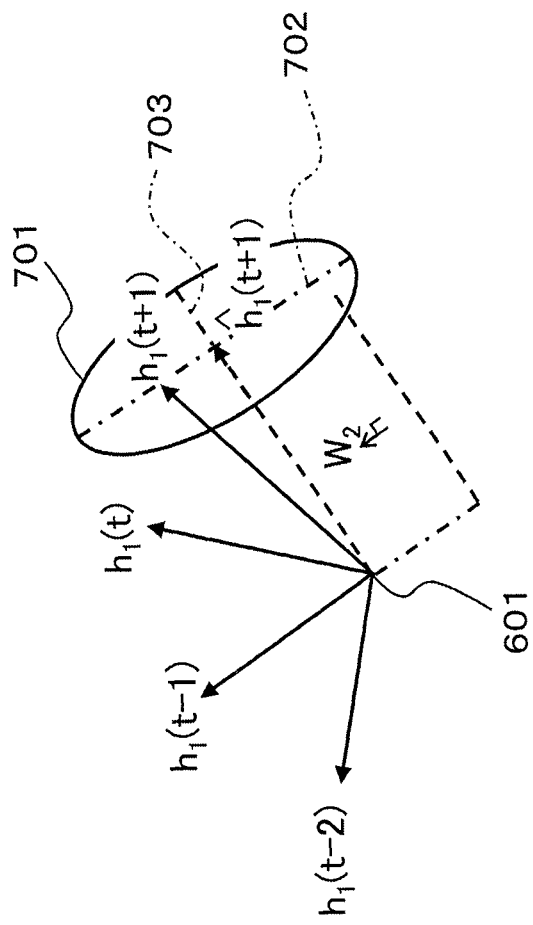
FIG. 7 is a diagram that illustrates an example of calculation of a transmission weight using the arithmetic apparatus to calculate an interference suppression parameter for a radio device of the radio communication system according to Embodiment 1.

Thus, according to one embodiment, not only a predictive value of the channel state but also a predictive error is used. In other words, the weight is determined in consideration of the tendency or stochastic spread of a predictive error in a predictive value of the channel state. An error between the predictive value $\hat{h}_1(t+1)$ of the channel state and the actual channel vector $h_1(t+1)$, as illustrated in FIG. 7, may be considered to be distributed inside an ellipsoid 701 in a multi-dimensional space having the position of $\hat{h}_1(t+1)$ as its center from the origin. When the major axis of the ellipsoid 701 is denoted by reference numeral 702, and the minor axis thereof is denoted by reference numeral 703, it can be stated that a probability that the actual channel $h_1(t+1)$ deviates from $\hat{h}_1(t+1)$ in the major axis 702 direction is higher than a probability that the actual channel deviates in the minor axis 703 direction. The reason for this is that, in the principal component analysis, the major axis 702 is calculated as an axis for which the dispersion of the magnitude of the error $h_1(t+1)-\hat{h}_1(t+1)$ is largest. Accordingly, when the numbers of directions of axes of the ellipsoid 701 are defined in the descending order of the magnitude of the dispersion, it can be stated that $h_1(t+1)$ has a higher probability of deviating in the direction of an axis of a smaller number. The direction of each axis will be referred to as a "principal component direction of a predictive error".

Accordingly, it is preferable to determine the transmission weight $w_2$ of UE#2 to be not only orthogonal to the predictive value $\hat{h}_1(t+1)$ of the channel state of UE#1 but also orthogonal to the principal component direction of the predictive error in the channel state of UE#1. In other words, when the vector of the principal component direction of the predictive error is denoted by $q_1$, $w_2$ is calculated such that $\hat{h}_1(t+1) \cdot w_2 = 0$ and $q_1 \cdot w_2 = 0$. In addition, in other words, $w_2$ is calculated to be orthogonal to a subspace (for example, a plane) spanned by the vectors $\hat{h}_1(t+1)$ and $q_1$.

By calculating $w_2$ in this way, also in a case where $h_1(t+1)$ deviates in the direction of $q_1$, $h_1(t+1)$ is orthogonal to $w_2$, and UE#1 does not receive any interference from a transmission signal toward UE#2. Accordingly, by calculating the transmission weight as above, also in a case where the channel predictive error is large, an interference of a UE according to a change in the channel state can be decreased, whereby the performance can be improved.

In particular, by setting an axis for which the dispersion of the magnitude of the error $h_1(t+1)-\hat{h}_1(t+1)$ is largest as $q_1$, UE#1 does not receive any interference from a transmission signal toward UE#2 in the most reliable manner. Apparently, based on a relation with the other UEs, there may be a case where an axis for which the dispersion of the magnitude of the error $h_1(t+1)-\hat{h}_1(t+1)$ is second largest or less is configured to be orthogonal to $w_2$. However, also in such a case, it is preferable to set an axis for which the dispersion of the magnitude of the error $h_1(t+1)-\hat{h}_1(t+1)$ is as large as possible as $q_1$.

Hereinafter, unless otherwise mentioned, a vector is represented using a lower-case alphabetical character, and a matrix is represented using an upper-case alphabetical character. A transposed matrix of a matrix A is represented using $A^T$, and a transposed vector of a vector a is represented using $a^T$. In addition, $A^H$ represents a complex conjugate transposed matrix of a matrix A, and $a^H$ represents a complex conjugate transposed matrix of a vector a. Here, b* represents a complex conjugate of a scalar b. E{A}, E{a}, and E{b} respectively represents an average value of a matrix A, an average value of a vector a, and an average value of a scalar b. IN represents a unit matrix of N×N, $O_N$ represents a matrix of N×N of which all the components are 0's. diag $(a_1, a_2, \ldots, a_N)$ represents a diagonal matrix having a scalar column of $a_1, a_2, \ldots, a_N$ as its diagonal components. "X∩Y" represents the union of a set X and a set Y. "X/Y" represents a difference between a set X and a set Y, in other words, represents a set obtained by eliminating elements of the set Y from elements of the set X.

The predictive value calculator 301 will now be described in detail. A predictive value is calculated for each component of the channel matrix of each UE. The number (suffix) of UE#k is represented using k, and, in a case where UE#k is assumed to include a plurality of receiving antennas, a prediction is performed by weighting past M samples for channels $h_{k,i,j}(t+1)$ of a transmission antenna #j of a base station and a receiving antenna #i of UE#k. In this case, the predictive values $\hat{h}_{k,i,j}(t+1)$ can be represented as below. Here, $a_\tau$ is a predictive coefficient (scalar).

$$\hat{h}_{k,i,j}(t+1) = \sum_{\tau=1}^{M} a_\tau h_{k,i,j}(t-\tau+1) \qquad \text{[Numerical Expression 1]}$$

In a case where a term represented as $\hat{h}_{k,i,j}(t+1)$ using an image is represented using characters, it will be represented as $\hat{h}_{k,i,j}(t+1)$.

Hereinafter, for the simplification of denotations, the suffixes k, i, j will be omitted. When a vector a of a predictive coefficient and a matrix $h_t$ of samples acquired in a time series are denoted as $a = [a_1 \; a_2 \; \ldots \; a_M]^T$ and $h_t = [h(t) \; h(t-1) \; \ldots \; h(t-M+1)]^T$, $a_1, a_2, \ldots, a_M$, $h(t), h(t-1), \ldots, h(t-M+1)$ are scalar quantities. A predictive value calculated by the predictive value calculator 301 $\hat{h}(t+1) = a^T h_t$. In other words, $\hat{h}(t+1)$ is calculated by weighting channel estimations acquired in a time series. At this time, the following linear equations are satisfied for the vector a.

$\hat{h}(t) = a_1 h(t-1) + a_2 h(t-2) + \ldots + a_m h(t-M)$ $\hat{h}(t-1) = a_1 h(t-2) + a_2 h(t-3) + \ldots + a_m h(t-M-1) \ldots$
$\hat{h}(t-M+1) = M) + a_2 h(t-M-1) + \ldots + a_m h(t-2M+1)$ In a case where $h(t), h(t-1), \ldots, h(t-2M+1)$ are estimated by the channel estimator 204 and are stored in a storage of the base station apparatus 201 or the memory so as to be known, the vector a can be calculated.

In addition, by using $\hat{h}(t+1) = a^T h_t$, a predictive value of time t+1 can be calculated. Since the predictive value of time t+1 can be calculated, which means that predictive values of time t, time t−1, . . . , time t−N+1 can be calculated in a time series, and a time series predictive coefficient $a^{\wedge T}$ can be calculated using the following equation.

$$\hat{a}^T = \left( \sum_{\tau=t-N+1}^{t} h_\tau h_\tau^H \right)^{-1} \sum_{\tau=t-N+1}^{t} h^*(\tau) h_\tau \qquad \text{[Numerical Expression 2]}$$

Predictive values of the channel states that are predicted for components of the channel matrix are collected, and a predictive value $\hat{H}(t+1)$ of the channel matrix is calculated as below.

[Numerical Expression 3]

$$\hat{H}(t+1) = \begin{bmatrix} \hat{h}_{11}(t+1) & \hat{h}_{12}(t+1) & \ldots & \hat{h}_{1,N_{tx}}(t+1) \\ \hat{h}_{21}(t+1) & \hat{h}_{22}(t+1) & \ldots & \hat{h}_{2,N_{tx}}(t+1) \\ \vdots & \vdots & \ddots & \vdots \\ \hat{h}_{N_{rx},1}(t+1) & \hat{h}_{N_{rx},2}(t+1) & \ldots & \hat{h}_{N_{rx},N_{tx}}(t+1) \end{bmatrix}$$

The predictive error calculator 302 will be described in detail. The predictive error calculator 302 calculates predictive errors at the time of applying the time series predictive coefficient $a^{\wedge T}$ calculated by the predictive value calculator 301 to the samples of the channel state estimated by the channel estimator 204 in the past. The predictive error calculator 302, based on the calculated predictive errors, calculates a covariance matrix of the predictive errors as below. A channel matrix is represented using a column vector as below.

$$\eta(\tau) = [h_1^T(\tau)\ h_2^T(\tau)\ \ldots\ h_{N_{tx}}^T(\tau)]^T$$

$$\hat{\eta}(\tau) = [\hat{h}_1^T(\tau)\ \hat{h}_2^T(\tau)\ \ldots\ \hat{h}_{N_{tx}}^T(\tau)]^T \quad \text{[Numerical Expression 4]}$$

Here, $h_j(\tau)$ is a j-th column of $H(\tau)$, and $\hat{h}_j(\tau)$ is a j-th column of $\hat{H}(\tau)$. By using this vector representation, a covariance matrix C of predictive values at the time of applying the predictive coefficient calculated by the predictive error calculator 302 to the past samples is represented as below.

$$C = \sum_{\tau=t-N+1}^{t} (\eta(\tau) - \hat{\eta}(\tau))(\eta(\tau) - \hat{\eta}(\tau))^H \quad \text{[Numerical Expression 5]}$$

The interference suppression parameter calculator 303 performs eigenvalue decomposition of the covariance matrix for a principal component analysis.

$$C = \Phi \Lambda \Phi^H$$

Here, Λ is a diagonal matrix having eigenvalues of the covariance matrix C of the predictive error as its diagonal components and is a diagonal matrix in which the eigenvalues of the covariance matrix C are aligned in the descending order. In addition, Φ is a matrix in which eigenvectors of the covariance matrix C of the predictive error are aligned.

At this time, the eigenvectors of the covariance matrix C represent a principal component direction of the predictive error. Here, the aligning of the eigenvectors of the covariance matrix C in the descending order of the magnitude of a corresponding eigenvalue corresponds to the aligning of the directions of axes of the ellipsoid 701 in the descending order of the magnitude of the dispersion described with reference to FIG. 7.

Each eigenvector of the covariance matrix is represented in the form of a channel matrix as below.

[Numerical Expression 6]

$$Q_n = \begin{bmatrix} \phi_{1,n} & \phi_{N_{rx}+1,n} & \cdots & \phi_{N_{rx}(N_{tx}-1)+1,n} \\ \phi_{2,n} & \phi_{N_{rx}+2,n} & \cdots & \phi_{N_{rx}(N_{tx}-1)+2,n} \\ \vdots & \vdots & \ddots & \vdots \\ \phi_{N_{rx},n} & \phi_{2N_{rx},n} & \cdots & \phi_{N_{rx}N_{tx}+1,n} \end{bmatrix}$$

Here, $\phi_{m,n}$ represents a component of the m-th row and the n-th column of the matrix Φ. $Q_n$ will be referred to as an n-th principal component of the predictive error.

Up to here, while scripts representing a UE have been omitted, hereinafter, an n-th principal component of UE#k will be denoted by $Q_{k,n}$. $Q_{k,n}$ is an interference suppression parameter calculated by the interference suppression parameter calculator 303.

Hereinafter, the scheduler 207 will be described in detail. At a scheduling processing time point t, a latest channel estimated value of UE#k, which is known in the scheduler 207, is assumed to be $H_k(t)$ ($N_{rx} \times N_{tx}$ matrix). For the simplification of description, for all the UEs, radio communication channels for the base station are assumed to be frequency-flat channels, and the scheduler 207 is assumed to perform wideband scheduling in which signals of user data are transmitted using all the bands. However, also in a case where frequency-selective channels or a case where sub-band scheduling is performed, the present disclosure can be applied. Hereinafter, proportional fairness scheduling will be assumed for description.

A set of scripts representing all the UEs will be represented as K. The scheduler 207 sequentially determines an element (a script of a UE) of K and performs scheduling. The scheduler 207 can determine a first element $u_1$ of K that is determined first based on a data rate of communication with the UE as below.

$$u_1 = \arg\max_{k \in \mathcal{K}_{tmp}} R_k^{-1} \sum_{v=1}^{N_{rx}} r(\gamma_{k,v}^{(SU)}) \quad \text{[Numerical Expression 7]}$$

Here, $\mathcal{K}_{tmp} = K$. In addition, $R_k$ is an average data rate of UE#k, and $r(\gamma)$ represents an instantaneous data rate at γ that is an instantaneous SNR. $\gamma_{k,v}^{(SU)}$ is an instantaneous SNR of a v-th layer of a case where only UE#k is allocated. For example, in a case where the number of receiving antennas is one, the instantaneous SNR can be represented using the following equation.

$$\gamma_{k,1}^{(SU)} = \frac{\|H_k(t)\|^2}{\sigma_k^2} \quad \text{[Numerical Expression 8]}$$

Here, $\sigma_k^2$ represents interference noise power of UE#k.

In order to select a second UE and subsequent UEs, $\mathcal{K}_{tmp}$ is updated using the following equation, and U is determined.

$$\mathcal{K}_{imp} = \mathcal{K}_{imp} \setminus \{u_1\} \quad \text{[Numerical Expression 9]}$$

$$\mathcal{U} = \{u_1\}$$

$$f_1^{(tmp)} = \sum_{l=1}^{m} R_{u_1}^{-1} \sum_{v=1}^{N_{rx}} r(\gamma_{u_1,v}^{(SU)})$$

In other words, $\mathcal{K}_{tmp}$ is a set of scripts of UEs of which scheduling has not been determined, and U is a set of scripts of UEs of which scheduling is determined.

The scheduler 207 selects an m-th UE that is a second or subsequent UE having $u_m$ as its script as below. In other words, the m-th UE can be selected such that a sum of PF metrics of users within a combination of UEs is maximum.

$$u_m = \arg\max_{u \in \mathcal{L}} \left[ \sum_{l=1}^{m} R_{k_{\mathcal{U} \cup \{u\},l}}^{-1} \sum_{v=1}^{N_{rx}} r(\gamma_{l,v|\mathcal{U} \cup \{u\}}) \right] \quad \text{[Numerical Expression 10]}$$

Here, $k_{s,l}$ represents identification information (script) of the l-th UE within a combination S of UEs. In addition, the following expression represents an instantaneous SNR of the l-th UE within the combination S of UEs in a case where multi-user MIMO transmission is performed for the combination S of UEs, and details thereof will be described later.

$$\gamma_{l|s}^{(ZF)} \quad \text{[Numerical Expression 11]}$$

In addition, the following expression is a set of scripts of UEs within $\mathcal{K}_{tmp}$ and is a set of scripts of UEs that can be directed toward a null and is defined using Numerical Expression 13.

$$\mathcal{L}$$ [Numerical Expression 12]

$$\mathcal{L} = \left\{ u \in \mathcal{K}_{tmp} : N_{rx} \cdot \max\left[\max_{j \leq m-1}\left(\sum_{l=1,l\neq j}^{m-1} N_{ref,k_{u,j}}\right) + N_{ref,u}, \sum_{l=1}^{m-1} N_{ref,k_{u,l}}\right] \leq N_{tx} - N_{rx} \right\}$$ [Numerical Expression 13]

When a set defined using Numerical Expression 13 is not an empty set, it is described as "the restriction of the degree of freedom directed toward a null is satisfied".

Since the script $u_m$ of the m-th UE is determined, in order to determine the script $u_{m+1}$ of the next UE that is a (m+1)-th UE, a set $K_{tmp}$, a set U, and a value $f^{(tmp)}_m$ are defined as below.

$$\mathcal{K}_{tmp} = \mathcal{K}_{tmp} \setminus u_m$$
$$\mathcal{U} = \mathcal{U} \cup \{u_m\}$$ [Numerical Expression 14]
$$f^{(tmp)}_m = \sum_{l=1}^{m} R^{-1}_{k_{\mathcal{U},l}} \sum_{v=1}^{N_{rx}} r(\gamma_{l,v|u})$$

The process described above is performed up to a maximum multiplexing number M. Finally, the multiplexing number m_max for which a proportional fairness metric is maximum is determined using "m_max=argmax$_m$ f$^{(tmp)}_m$", and UE#$u_1$, UE#$u_2$, ... UE#$u_{m\_max}$ are set as scheduling target UEs.

Figure 8:
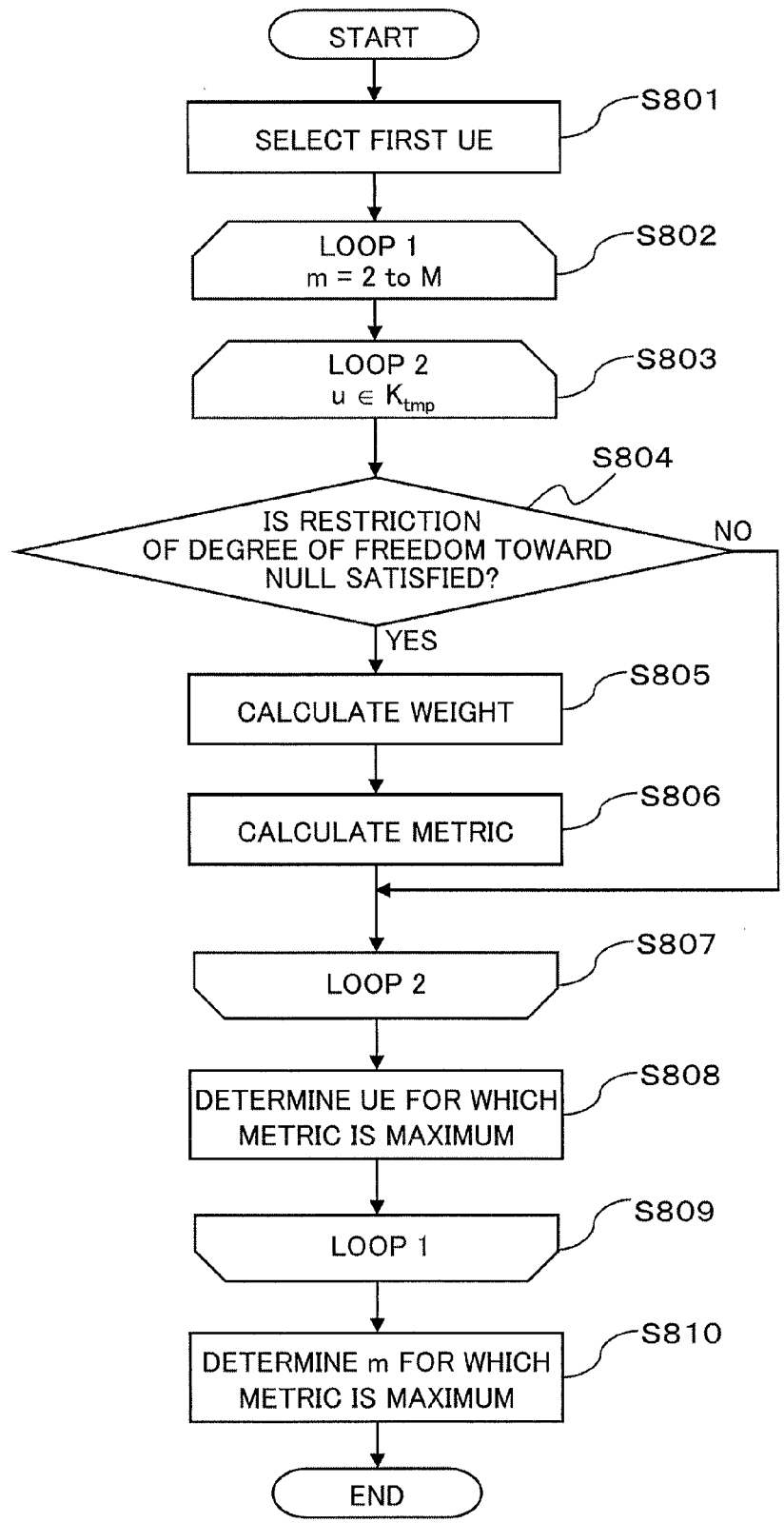
FIG. 8 is a flowchart of a process performed by the base station apparatus of the radio communication system according to Embodiment 1.

FIG. 8 is a flowchart of the above-described process determining UE#$u_1$, UE#$u_2$, ... UE#$u_{m\_max}$. In Step S801, the script $u_1$ of the first UE is determined, and the first UE (UE#$u_1$) is selected. Steps S802 to S809 form a loop that is executed with an integer value of two to the multiplexing number M sequentially substituted into a variable m. In addition, Steps S803 to S807 form a loop executed with an element of a set $K_{tmp}$ sequentially substituted into a variable u.

In Step S804, it is determined whether or not the restriction of the degree of freedom directed toward a null is satisfied. In other words, it is determined whether or not a set of UEs within $K_{tmp}$ capable of being directed toward a null is an empty set. In a case where the restriction of the degree of freedom directed toward a null is satisfied, the process branches into "Yes" and proceeds to Step S805. On the other hand, in a case where the restriction of the degree of freedom directed toward a null is not satisfied, the process branches into "No" and skips Steps S805 and S806.

In Step S805 (in the case of branching into "Yes" in Step S804), a weight to be transmitted to UE#u is calculated. The calculation of the weight will be described later in detail.

In Step S806, a metric $f^{(tmp)}_m$ is calculated.

When the loop of Step S803 to Step S807 ends, in Step S808, a UE for which the metric is maximum is determined. More specifically, $u_m$ is determined using Numerical Expression 11.

When the loop of Step S802 to Step S809 ends, in Step S810, m for which the metric is maximum is determined. More specifically, m is determined to be m_max by using m_max=argmax $f^{(tmp)}_m$.

Figure 9:
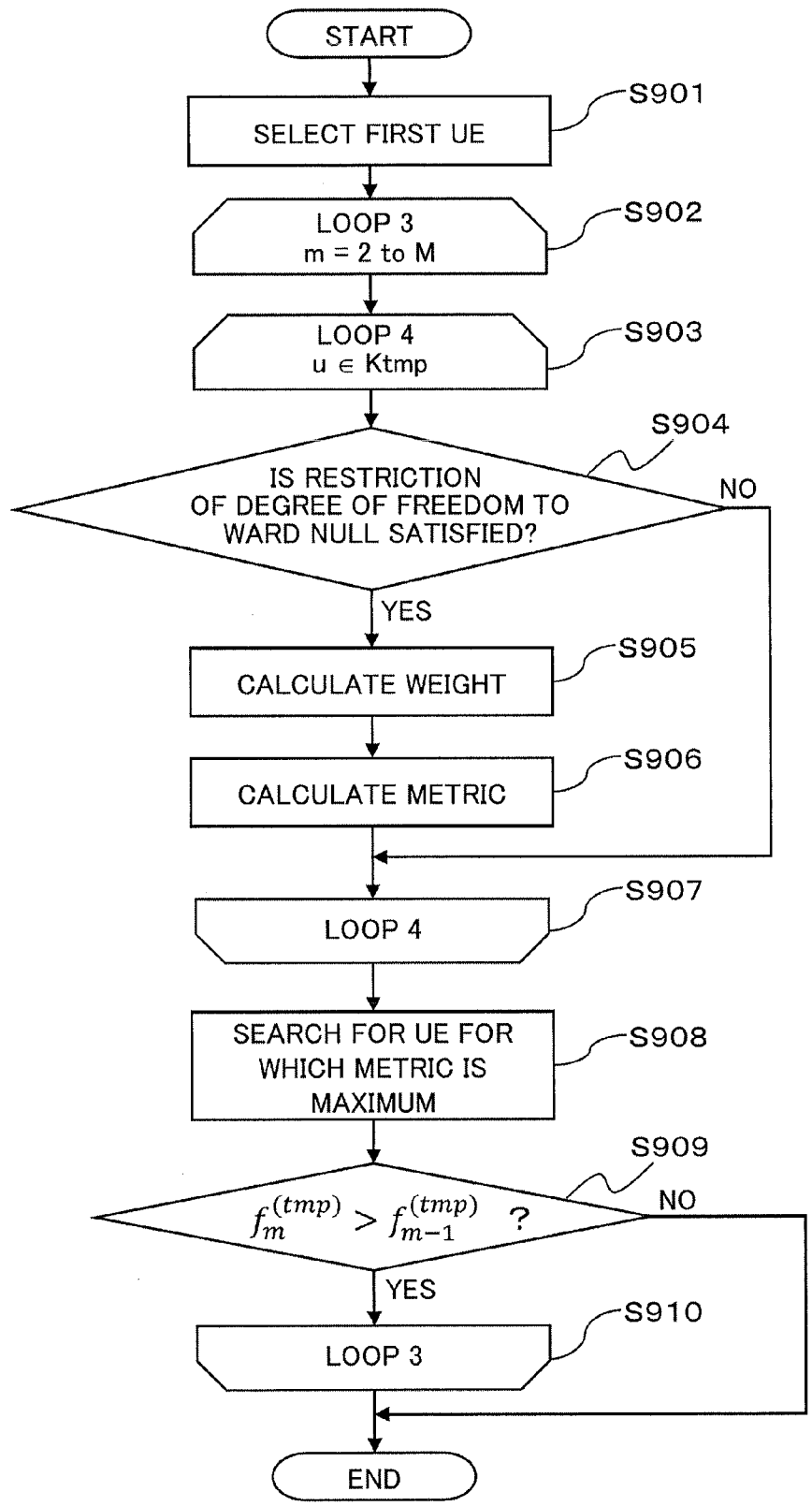
FIG. 9 is a flowchart of a process performed by the base station apparatus of the radio communication system according to Embodiment 1.

The flowchart illustrated in FIG. 8 can be changed as below. In the flowchart illustrated in FIG. 8, while the loop of Steps S802 to S809 is executed until the maximum multiplexing number M is substituted into the variable M, it may be changed as below. The metric $f^{(tmp)}_m$ calculated in Step S806 is compared with $f^{(tmp)}_{m-1}$ after Step S808, and the loop of S802 to S809 is ended when $f^{(tmp)}_m \leq f^{(tmp)}_{m-1}$. According to such a change, the process can be ended in an early stage. A flowchart in which such a change is made is illustrated in FIG. 9.

In Step S901, the script $u_1$ of the first UE is determined, and the first UE (UE#$u_1$) is selected. Steps S902 to S910 foam a loop that is executed with an integer value of two to the multiplexing number M sequentially substituted into a variable m. In addition, Steps S903 to S907 form a loop executed with an element of a set $K_{tmp}$ sequentially substituted into a variable u.

In Step S904, it is determined whether or not the restriction of the degree of freedom directed toward a null is satisfied. In other words, it is determined whether or not a set of UEs within $K_{tmp}$ capable of being directed toward a null is an empty set. In a case where the restriction of the degree of freedom directed toward a null is satisfied, the process branches into "Yes" and proceeds to Step S905. On the other hand, in a case where the restriction of the degree of freedom directed toward a null is not satisfied, the process branches into "No" and skips Steps S905 and S906.

In Step S905 (in the case of branching into "Yes" in Step S904), a weight to be transmitted to UE#u is calculated. The calculation of the weight will be described later in detail.

In Step S906, a metric $f^{(tmp)}_m$ is calculated.

When the loop of Step S903 to Step S907 ends, in Step S908, a UE for which the metric is maximum is determined. More specifically, $u_m$ is determined using Numerical Expression 11.

In Step S909, it is determined whether or not $f^{(tmp)}_m > f^{(tmp)}_{m-1}$. In a case where $f^{(tmp)}_m > f^{(tmp)}_{m-1}$ the loop of Steps S902 to S910 is continued. On the other hand, in a case where $f^{(tmp)}_m \leq f^{(tmp)}_{m-1}$, the loop of Steps S902 to S910 is ended.

In the description presented above, the scripts of UEs are sequentially determined. Instead of the sequential determinations, the process may be performed for each combination of scripts of UEs. Instead of determining $u_m$ by using Numerical Expression 11 described above, $c_{max}$ is determined using the following equation.

$$c_{max} = \underset{c \in C}{\arg\max}\left[\sum_{l=1}^{m} R^{-1}_{k_{c,l}} r(\gamma^{(ZF)}_{l|c})\right]$$ [Numerical Expression 15]

Here, a set C is a set of scripts of UEs of a multiplexing number that is a natural number of M or less and is a set of scripts of UEs capable of being directed toward a null.

$$C = \left\{ C \in \mathcal{A} : N_{rx} \cdot \max_{j \leq m}\left(\sum_{l=1,l\neq j}^{m} N_{ref,k_{c,l}}\right) \leq N_{tx} - N_{rx} \right\}$$ [Numerical Expression 16]

Here, a set A is an entire set of combinations of UEs of a multiplexing number that is a natural number of M or less.

The set A does not need to be a set of all the combinations of UEs of a multiplexing number that is a natural number of M or less but may be a set of which elements are narrowed down from the entire set by certain preprocessing.

In the description presented above, an example of sequential determinations of UEs according to proportional fairness scheduling and the process for each combination of UEs has been illustrated. However, any other determination of UEs may be performed as long as the UEs are selected so as to satisfy the restriction of the degree of freedom directed toward a null. In addition, not only the proportional fairness scheduling, but also any other scheduling such as rate maximizing scheduling, a minimum-rate maximizing scheduling may be applied.

Here, the calculation of an instantaneous SNR and a weight of an l-th UE within a combination S of UEs will be described. A unit that calculates a weight may be referred to as a weight calculator 217. The weight calculator 217, for example, may be mounted as a part of the scheduler 207. A connection channel matrix of channel predictive values is acquired using the following equation.

$$\tilde{F}_S = [\hat{H}_{k_{S,1}}{}^T(t+1)\ \hat{H}_{k_{S,2}}{}^T(t+1)\ \ldots\ \hat{H}_{k_{S,|S|}}{}^T(t+1)]^T$$  [Numerical Expression 17]

Here, |S| is the number of elements of a set S. Next, by using $Q_n$ that is an interference suppression parameter calculated by the interference suppression parameter calculator 303, a weight dedicated for each UE within S is calculated. A weight dedicated for an l-th UE within S is determined to be orthogonal to predicted channels and principal components of the other UEs. For example, the calculation is performed as follows.

From one of l'-th UEs ($1 \le l' \le |S|$) other than the l-th UE, a principal component of a $(N_{ref,k,S,l'}-1)$-th (the following expression) predictive error is connected to the connection channel matrix described above, and calculation represented in Numerical Expression 19 is performed.

$$N_{ref,k_{S,l}}-1$$  [Numerical Expression 18]

$$\tilde{F}_{l|S} = \begin{bmatrix} \tilde{F}_S^T & G_1^T & \ldots & G_{l-1}^T & G_{l+1}^T & \ldots & G_{|S|}^T \end{bmatrix}^T$$  [Numerical Expression 19]

$$G_{l'} = \begin{bmatrix} Q_{k_{S,l'},1}^T & Q_{k_{S,l'},2}^T & \ldots & Q_{k_{S,l'},N_{ref,k_{S,l'}}-1}^T \end{bmatrix}^T$$

In a case where the number of receiving antennas of the UE is one, the weight is a weight according to zero forcing. In other words, the weight $w_l$ of the l-th UE of S is a vector represented below.

$$w_l = \frac{\sqrt{p_l}\,(W_l)_l}{\|(W_l)_l\|}$$  [Numerical Expression 20]

Here, a matrix $W_1$ is calculated using the following equation, and $(W_1)_l$ represents an l-th column of the matrix $W_1$.

$$W_l = \tilde{F}_{l|S}{}^H (\tilde{F}_{l|S} \tilde{F}_{l|S}{}^H)^{-1}$$  [Numerical Expression 21]

Here, $p_l$ represents the transmission power of the l-th UE. In the case of equal-power distribution, when total transmission power is denoted by P, $p_1 = p_2 = \ldots = p_{|S|} = P/|S|$. Accordingly, an instantaneous SNR of the l-th UE within S is as represented in the following expression.

$$\gamma_{l,1|S} = \frac{p_l}{\sigma_{k_{S,l}}^2 \|w_l\|^2}$$  [Numerical Expression 22]

In a case where the number of receiving antennas of a UE is two or more, a weight can be calculated by performing a block diagonalization process and a process using an eigenmode. A matrix of weights of the l-th UE within combinations of UEs can be represented using the following equation.

$$W_l^{(BD)} = \tilde{V}_l^{(BD)} \cdot V_l^{(EM)} \cdot \mathrm{diag}$$  [Numerical Expression 23]

$$\left\{ \frac{\sqrt{p_{l,1}}}{\|(\tilde{V}_l^{(BD)} \cdot V_l^{(EM)})_1\|}\ \frac{\sqrt{p_{l,2}}}{\|(\tilde{V}_l^{(BD)} \cdot V_l^{(EM)})_2\|}\ \ldots\ \frac{\sqrt{p_{l,N_{rx}}}}{\|(\tilde{V}_l^{(BD)} \cdot V_l^{(EM)})_{\tilde{N}_{rx}}\|} \right\}$$

$$\tilde{F}_{l|S} = US\begin{bmatrix} \tilde{V}_l^{(1)} & \tilde{V}_l^{(0)} \end{bmatrix}^H$$  [Numerical Expression 24]

$\tilde{V}_l^{(BD)}$ is a matrix (or a matrix of $N_{rx}$ columns generated using a linear combination of rows of $\tilde{V}_l^{(0)}$) acquired by selecting arbitrary $N_{rx}$ columns of a matrix $\tilde{V}_l^{(0)}$ of $N_{tx} \times \{N_{tx} - |S| - 1)N_{rx}\}$ representing an null space acquired by singular value decomposition of $\tilde{F}_{l|S}$ with Numerical Expression 24. In addition, $V_l^{(EM)}$ is an eigenmode weight matrix of an equivalent channel after block diagonalization, and the equivalent channel $H_l \tilde{V}_l^{(BD)}$ after the block diagonalization can be acquired through singular value decomposition by Numerical Expression 25.

$$H_l \tilde{V}_l^{(BD)} = U_l \Lambda_l (V_l^{(EM)})^H$$  [Numerical Expression 25]

$p_{l,v}$ represented in Numerical Expression 23 is power assigned to a v-th layer of an l-th UE within a combination of UEs. Accordingly, an instantaneous SNR of the v-th layer of the l-th UE within the combination of UEs is as follows.

$$\gamma_{l,v|S} = \frac{p_{l,v}((\Lambda_l)_{v,v})^2}{\sigma_{k_{S,l}}^2 \|(\tilde{V}_l^{(BD)} \cdot V_l^{(EM)})_v\|^2}$$  [Numerical Expression 26]

Figure 10:
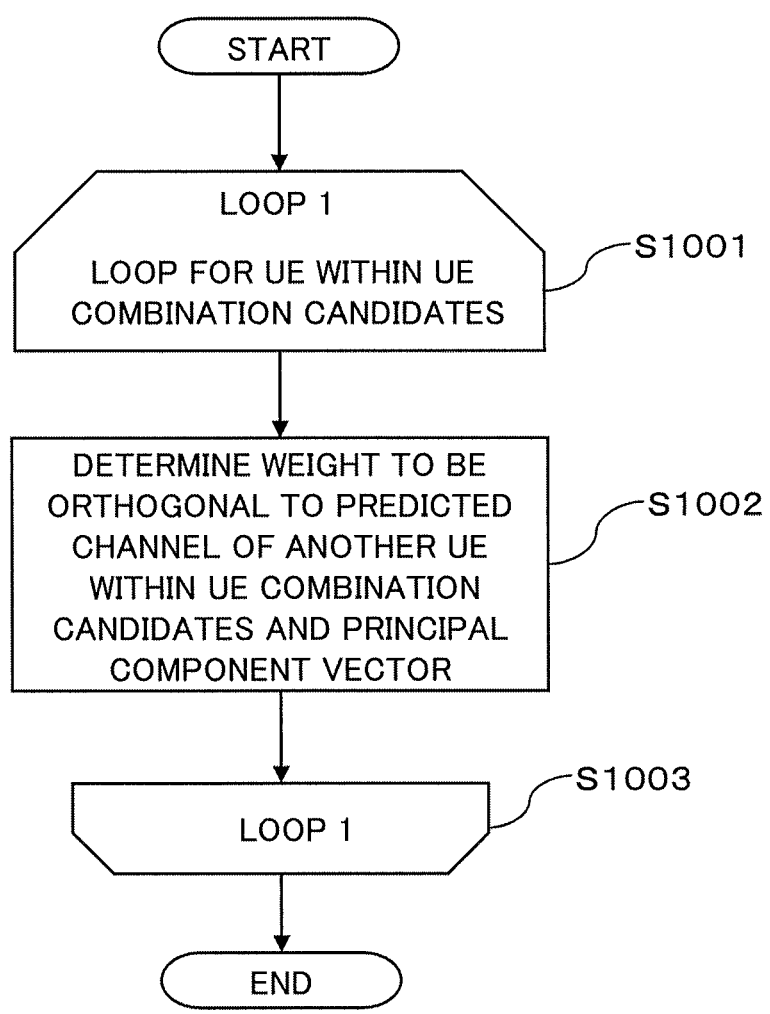
FIG. 10 is a flowchart of a process performed by the base station apparatus of the radio communication system according to Embodiment 1.

The flowchart of the calculation of weights described above is as illustrated in FIG. 10. Steps S1001 to S1003 form a loop of a UE within candidates for a combination of UEs.

In Step S1002, a weight is determined to be orthogonal to predicted channels and principal component vectors of the other UEs within candidates for the combination of UEs.

As above, in a case where the number of receiving antennas of a UE is one, zero forcing is applied. On the other hand, in a case where the number of receiving antennas of the UE is two or more, weights can be calculated by performing the block diagonalization process and the process using an eigenmode. However, only the block diagonalization process may be applied without using the eigenmode.

Figure 11:
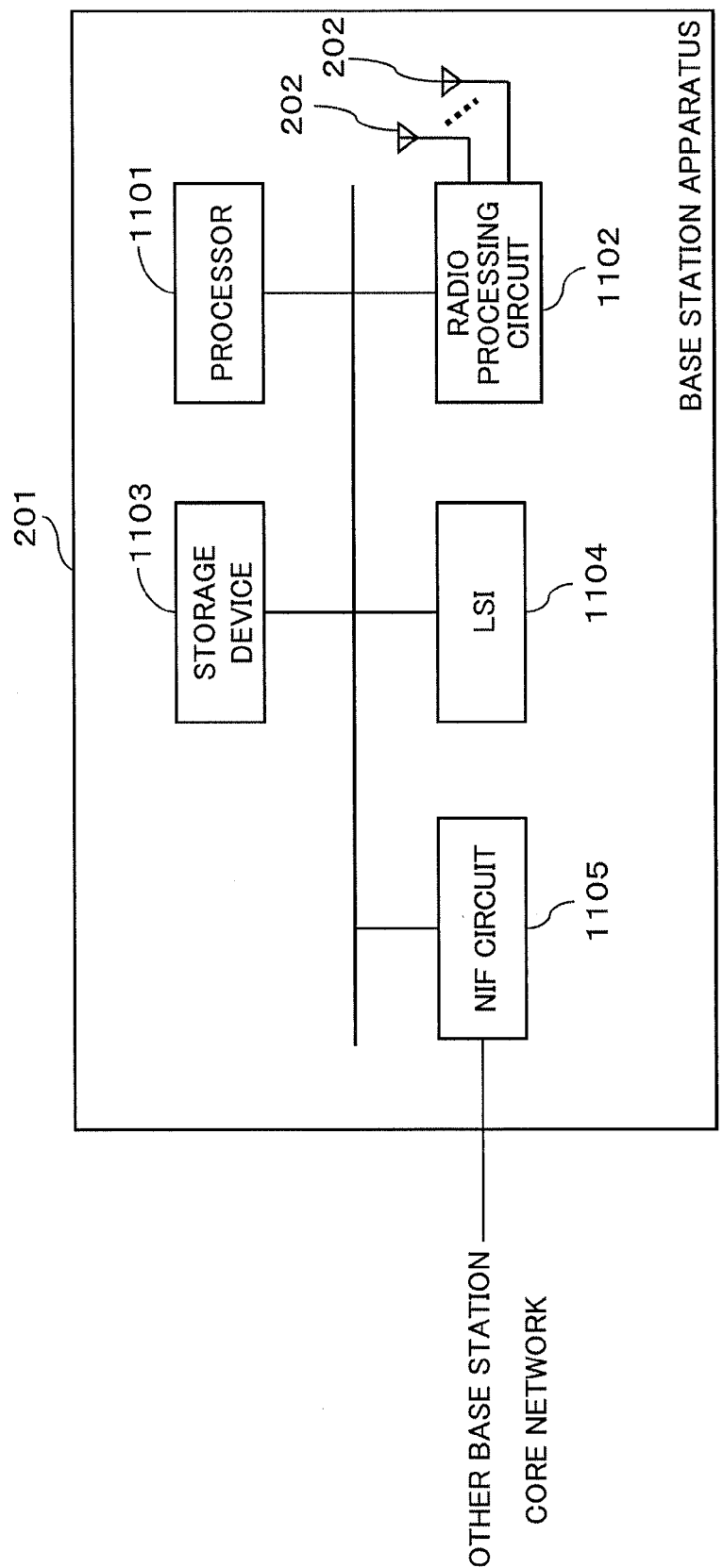
FIG. 11 is a hardware configuration diagram of the base station apparatus of the radio communication system according to Embodiment 1.

FIG. 11 is a hardware configuration diagram of the base station apparatus 201. The base station apparatus 201 includes antennas 202, a processor 1101, a radio processing circuit 1102, a storage device 1103, a large scale integrated circuit (LSI) 1104, and a network interface (NIF) circuit 1105. The antennas 202 have already been described.

The storage device 1103 is a storage medium configured by using any one or both of a nonvolatile storage device such as a hard disk or a solid state drive (SSD) and a volatile storage device such as a dynamic random access memory (DRAM). The storage device 1103 stores programs executed by the processor 1101 and various setting parameters. In addition, the storage device 1103 provides a temporary work area of a case where the processor 1101 executes a program.

The processor 1101, for example, is a central processing unit (CPU) and executes programs stored in the storage device 1103. By using programs executed by the processor 1101, for example, the functions of the arithmetic apparatus 206 to calculate an interference suppression parameter for a radio device and the scheduler 207 are realized. In addition, by using programs executed by the processor 1101, the process of the device driver for the NIF circuit 1105, the LSI 1104, and the radio processing circuit 1102 is realized. Accordingly, data input/output among the NIF circuit 1105, the LSI 1104, and the radio processing circuit 1102 is performed.

The radio processing circuit 1102 corresponds to the UL radio processor 203 and the DL radio processor 216. The LSI 1104, for example, performs signal processing in the multiplier 211, the channel multiplexer 212, the IFFT 214, the CP adder 215, and the like.

The NIF circuit 1105 is an interface circuit used for communicating with other base stations, other base station apparatuses, and a core network.

The processor 1101 may be configured as hardware not using a program by using a field programmable gate array (FPGA) not as a configuration executing a program.

Figure 12:
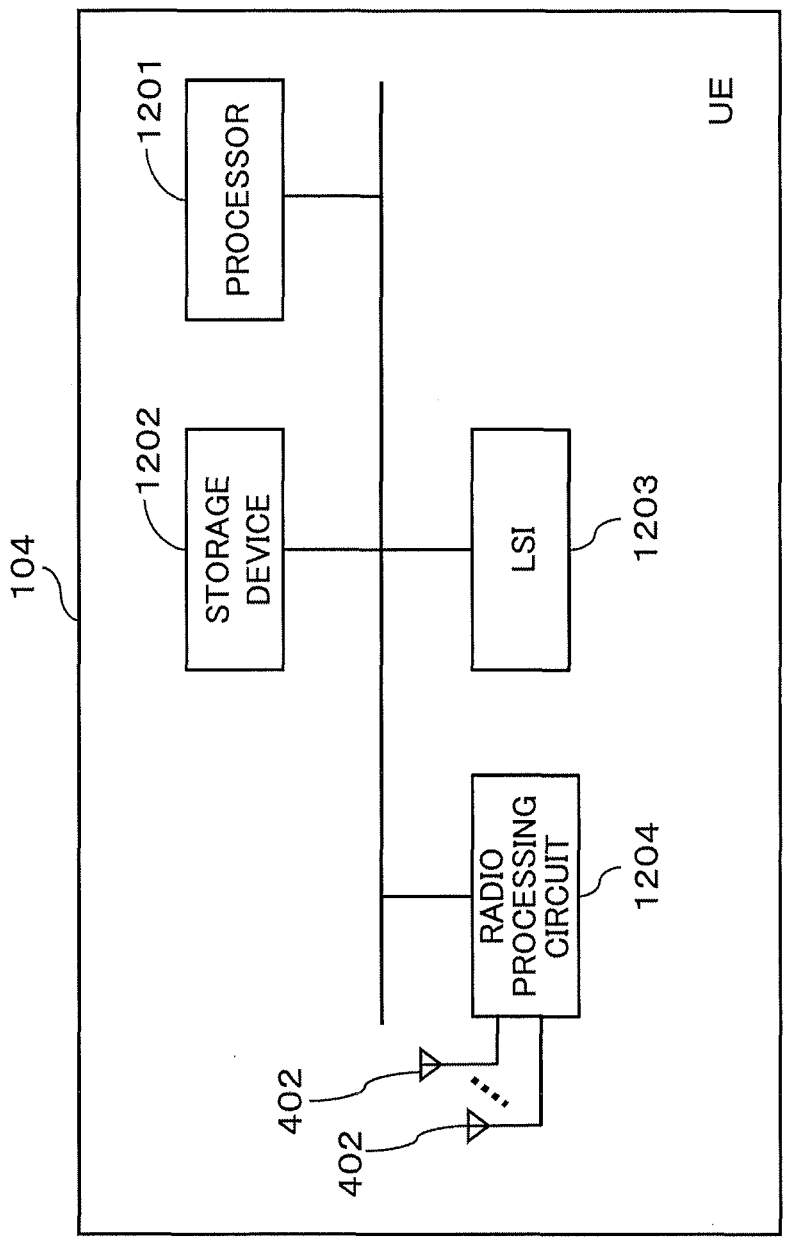
FIG. 12 is a hardware configuration diagram of a UE of the radio communication system according to Embodiment 1.

FIG. 12 is a hardware configuration diagram of the UE 104. The UE 104 includes antennas 402, a processor 1201, a storage device 1202, an LSI 1203, and a radio processing circuit 1204. The antennas 402 have already been described.

The storage device 1202 is a storage medium configured by using any one or both of a nonvolatile storage device such as a hard disk or an SSD and a volatile storage device such as a DRAM. The storage device 1202 stores programs executed by the processor 1201 and various setting parameters. In addition, the storage device 1202 provides a temporary work area of a case where the processor 1201 executes a program.

The processor 1201, for example, is a CPU and executes programs stored in the storage device 1202. By using programs executed by the processor 1201, for example, the functions of the error correction decoder 409 and the Ack/Nack generator 410 are realized. In addition, by using programs executed by the processor 1201, the process of the device driver for the LSI 1203 and the radio processing circuit 1204 is realized, and data input/output between the LSI 1203 and the radio processing circuit 1204 is performed.

The radio processing circuit 1204 corresponds to the DL radio processor 403 and the UL radio processor 413. The LSI 1203, for example, performs signal processing in the CP remover 404; the FFT 405; the demodulator 408; the UL transmitter 412; and the like.

The processor 1201 may be configured as hardware not using a program by using a (FPGA) not as a configuration executing a program.

In this way, according to this embodiment, a predictive value and a predictive error for a radio communication channel are calculated, and an interference suppression parameter is calculated to be orthogonal to the predictive value and the predictive error. By using the interference suppression parameter, also in a case where a difference between the channel state at a time point at which the transmission weight is calculated and the channel state at a time point at which actual data is received is large, an interference between UEs according to a channel change can be decreased.

Embodiment 2

As Embodiment 2, a base station apparatus including an arithmetic apparatus to calculate an interference suppression parameter for a radio device selecting the number of eigenvectors of which eigenvalues correspond to eigenvalues of a threshold set in advance or more based on a result $\Phi \Lambda \Phi^H$ of eigenvalue decomposition of a covariance matrix C will be described.

Figure 13:
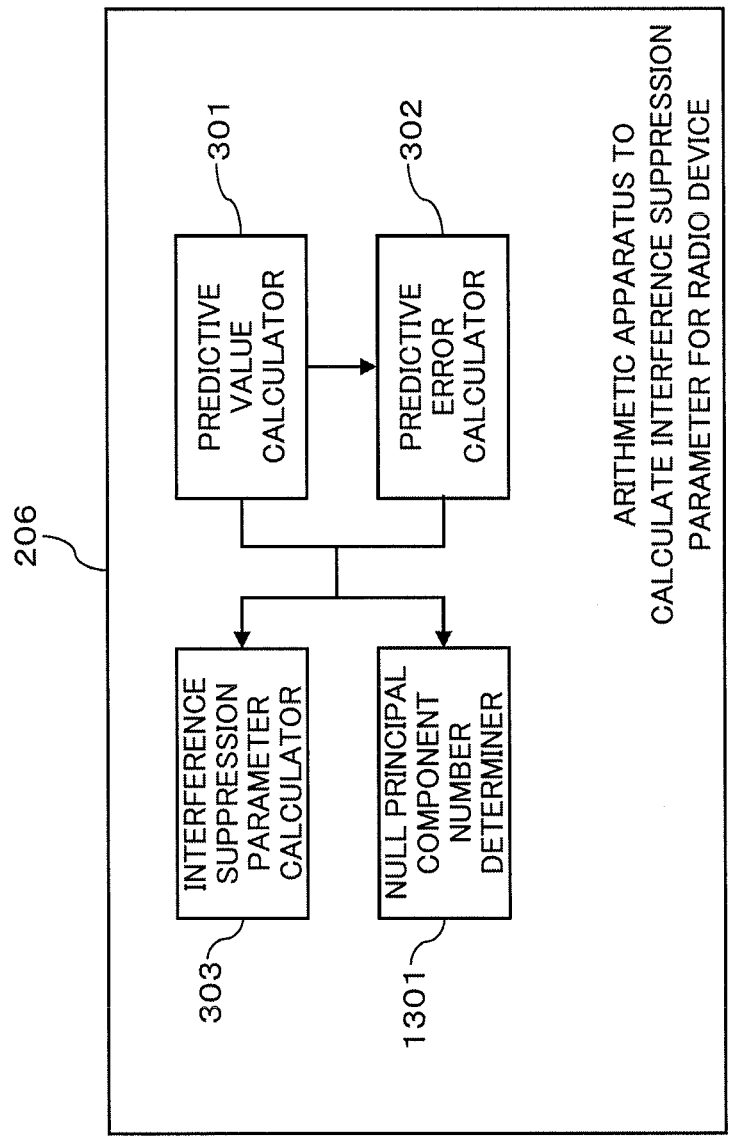
FIG. 13 is a functional block diagram of an arithmetic apparatus to calculate an interference suppression parameter for a radio device included in a base station apparatus of a radio communication system according to Embodiment 2.

FIG. 13 is a functional block diagram of the arithmetic apparatus 206 to calculate an interference suppression parameter for a radio device according to this embodiment. The arithmetic apparatus 206 to calculate an interference suppression parameter for a radio device includes a predictive value calculator 301, a predictive error calculator 302, an interference suppression parameter calculator 303, and a null principal component number determiner 1301. Thus, the arithmetic apparatus 206 to calculate an interference suppression parameter for a radio device according to this embodiment has a configuration in which the arithmetic apparatus 206 to calculate an interference suppression parameter for a radio device illustrated in FIG. 3 further includes the null principal component number determiner 1301.

In eigenvalue decomposition $\Phi \Lambda \Phi^H$ of a covariance matrix C, an eigenvalue of the covariance matrix of a channel predictive error in UE#k is represented in the following equation.

$$\Lambda_k = \text{diag}\{\lambda_{k,1}\ \lambda_{k,2}\ \ldots\ \lambda_{k,N_{rx}N_{tx}}\}, \lambda_{k,1} \geq \lambda_{k,2} \geq \ldots \geq \lambda_{k,N_{rx}N_{tx}} \quad \text{[Numerical Expression 27]}$$

The null principal component number determiner 1301 determines the number $N^{(null)}_{ref,k}$ of principal components in which UE#k is directed toward a null using a threshold $\lambda_{th}$ set in advance by using the following Equation.

$$N^{(null)}_{ref,k} = \underset{0 \leq n \leq N_{rx}N_{tx}}{\text{argmin}}\ \lambda_{k,n}\ \text{subject to}\ \lambda_{k,n} \geq \lambda_{th} \quad \text{[Numerical Expression 28]}$$

Here, $\lambda_{k,0} = \lambda_{th}$. In other words, the null principal component number determiner 1301 determines the number of principal components such that nulls are directed toward principal components corresponding to eigenvalues of the threshold $\lambda_{th}$ or more. At this time, the number $N_{ref,k}$ of nulls of UE#k=$N^{(null)}_{ref,k}$+1.

According to the principal component analysis, in a case where the eigenvalue increases, a probability that a predictive error occurs in the direction of an eigenvector corresponding to the eigenvalue increases. By setting the number of eigenvectors corresponding to eigenvalues of a threshold set in advance or more as the number of principal components directed toward a null, a direction in which the probability that a predictive error occurs is low can be excluded. In this way, the processes of the interference suppression parameter calculator 303 and the scheduler 207 can be efficiently performed.

Similar to a general principal component analysis, the number of principal components directed toward a null may be determined in accordance with an accumulated contribution rate exceeding the threshold for the first time. The accumulated contribution rate of a first principal component to an i-th principal component is $(\lambda_1+\lambda_2+\ldots+\lambda_i)/(\lambda_1+\lambda_2+\ldots+\lambda_{k,Nrx,Ntx})$. In this case, as a threshold of the accumulated contribution rate, for example, a value that is 0.5 or more and 0.8 or less can be selected.

Embodiment 3

As Embodiment 3, application of Embodiment 1 or 2 to single-user MIMO transmitting data to one UE will be described.

Figure 14:
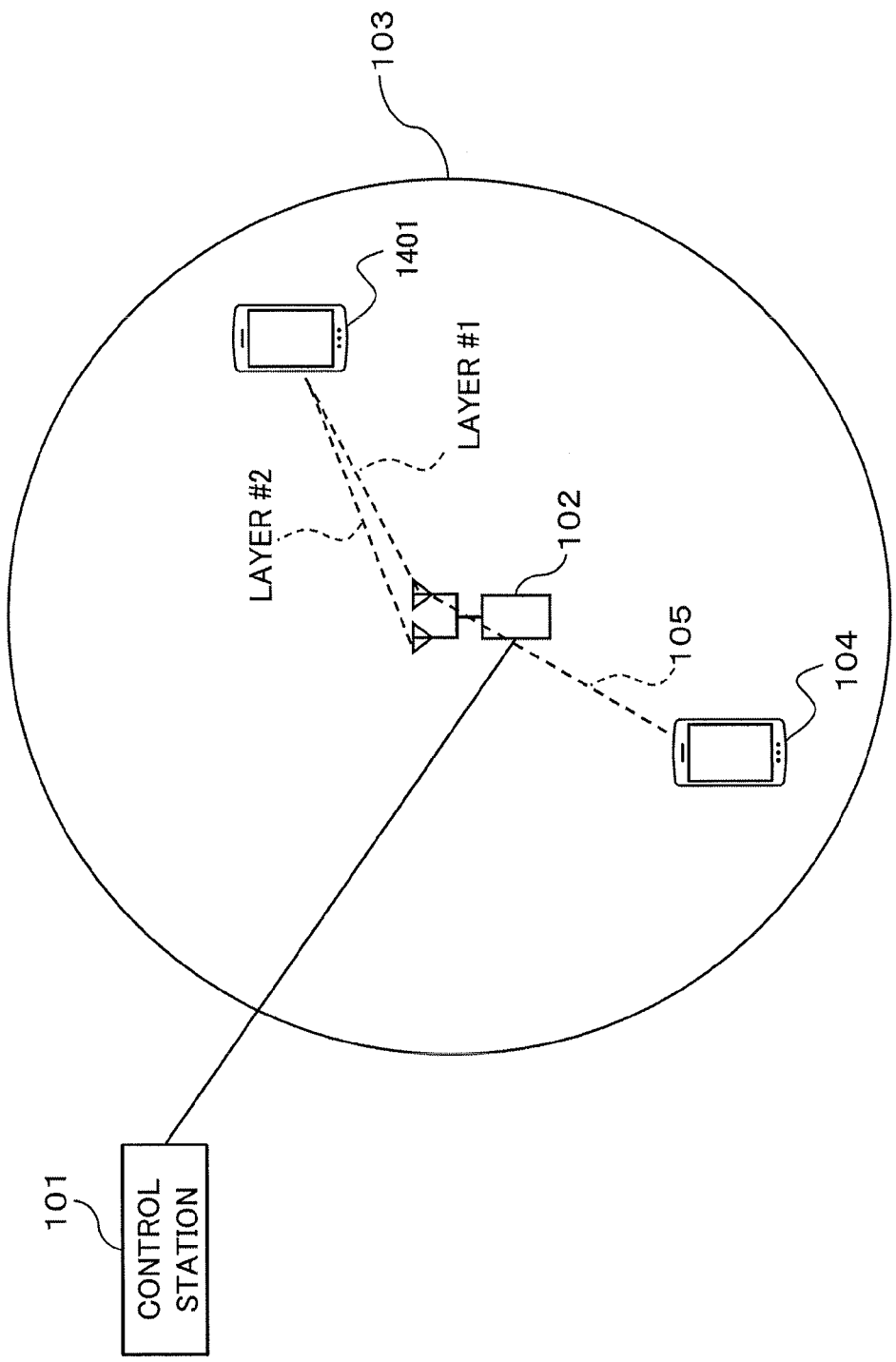
FIG. 14 is a diagram that illustrates a whole radio communication system according to Embodiment 3.

FIG. 14 is a diagram that illustrates a whole radio communication system according to this embodiment. A difference from the case illustrated in FIG. 1 is that one UE 1401 communicates with a base station 102 at same time/frequency resources in the configuration illustrated in FIG. 14.

In this embodiment, a scheduler 207 selects one UEUE#u by using the following equation.

$$u = \underset{k \in \varkappa}{\operatorname{argmax}} R_k^{-1} \sum_{v=1}^{N_{rx}} r(\gamma_{k,v}^{(SU-MIMO)})$$ [Numerical Expression 29]

Here, $\gamma^{(SU-MIMO)}{}_{k,v}$ represents an instantaneous SNR of a v-th layer of a case where data is transmitted to UE#k through single-user MIMO. A weight of the v-th transmission layer and an instantaneous SNR of the v-th transmission layer are calculated as below.

$$\tilde{F}_{k,v} = [H_k^T \ G_{k,1}^T \ldots G_{k,v-1}^T \ G_{k,v+1}^T \ldots G_{k,N_{rx}}^T]^T$$

$$G_{k,v} = [(Q_{k,1})_v^T \ (Q_{k,2})_v^T \ldots (Q_{k,N_{ref,k}-1})_v^T]$$ [Numerical Expression 30]

According to Numerical Expression 30, the transmission weight of the v-th transmission layer is as follows.

$$w_{k,v} = \frac{\sqrt{p_{k,v}} (W_{k,v})_v}{\|(W_{k,v})_v\|}$$ [Numerical Expression 31]

However, the transmission weight is as represented in Numerical Expression 32.

$$W_{k,v} = \tilde{F}_{k,v}^H (\tilde{F}_{k,v} \tilde{F}_{k,v}^H)^{-1}$$ [Numerical Expression 32]

Here, $(W_{k,v})_v$ represents a v-th column of a matrix $W_{k,v}$. In addition, $p_{k,v}$ represents transmission power of a v-th layer of UE#k. In the case of equal power distribution, the transmission power is as represented in Numerical Expression 33.

$$p_{k,1} = p_{k,2} = \ldots = p_{k,N_{rx}} = P/N_{rx}$$ [Numerical Expression 33]

Here, P is total transmission power. Accordingly, the instantaneous SNR of the l-th UE within a combination of UEs is as follows.

$$\gamma_{k,v}^{(SU-MIMO)} = \frac{p_{k,v}}{\sigma_k^2 \|W_{k,v}\|^2}$$ [Numerical Expression 34]

As above, in the single-user MIMO, by applying Embodiment 1 or 2 with communication in each transmission layer regarded as communication in each UE, also in a case where a predictive error relating to the transmission layer is large, an interference between transmission layers can be suppressed.

Embodiment 4

As Embodiment 4, an embodiment in which Embodiments 1 to 3 are applied to cooperative beam-forming performed by a plurality of base stations will be described.

Figure 15:
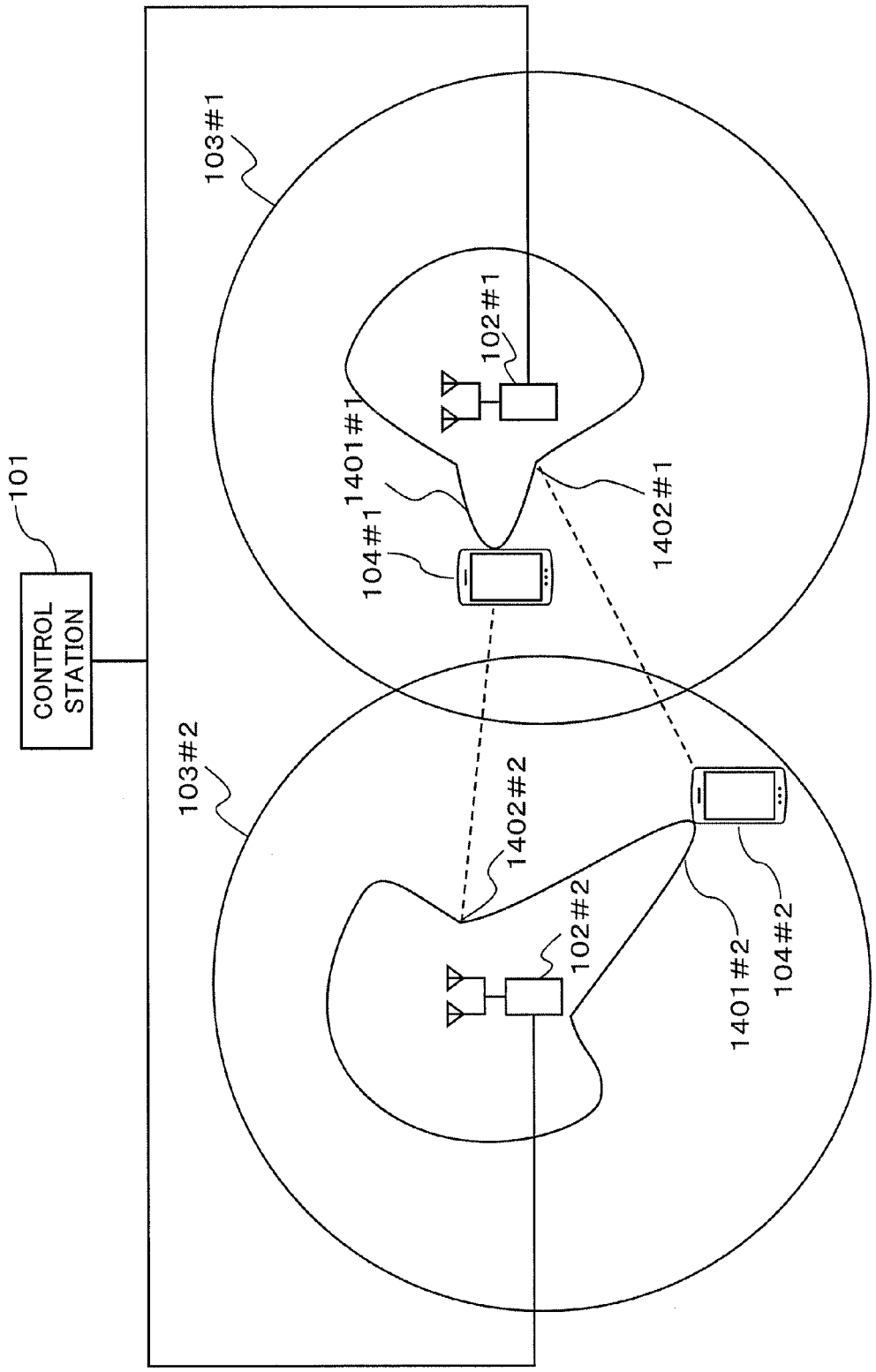
FIG. 15 is a diagram that illustrates an example of cooperative beam-forming between cells of a radio communication system according to Embodiment 4.

FIG. 15 is a diagram that illustrates an example of cooperative beam-forming performed by a plurality of base stations. A base station 102#1 and a base station 102#2 are connected to a control station 101. The base station 102#1 and the base station 102#2 respectively form a radio area 103#1 and a radio area 103#2, and the radio area 103#1 and the radio area 103# are radio areas neighboring to each other.

In this case, as illustrated in FIG. 15, when UE 104#1 is positioned in the radio area 103#1, there are cases where an interference of a radio signal transmitted from the base station 102#2 is received even in a case where UE 104#1 is not positioned in the radio area 103#2. In addition, as illustrated in FIG. 15, when UE 1002 is positioned in the radio area 103#2, there are cases where an interference of a radio signal transmitted from the base station 102#1 is received even in a case where UE 104#2 is not positioned in the radio area 103#1.

Thus, when the base station 102#1 directs a beam 1401#1 toward the UE 104#1, the base station 102#1 directs a null 1402#1 toward the UE 1002. Similarly, when the base station 102#2 directs a beam 1401#2 toward UE 1002, the base station 102#2 directs a null 1402#2 toward the UE 104#1. In this way, an inter-cell interference from the base station 102#1 and the base station 102#2 can be suppressed.

Figure 16:
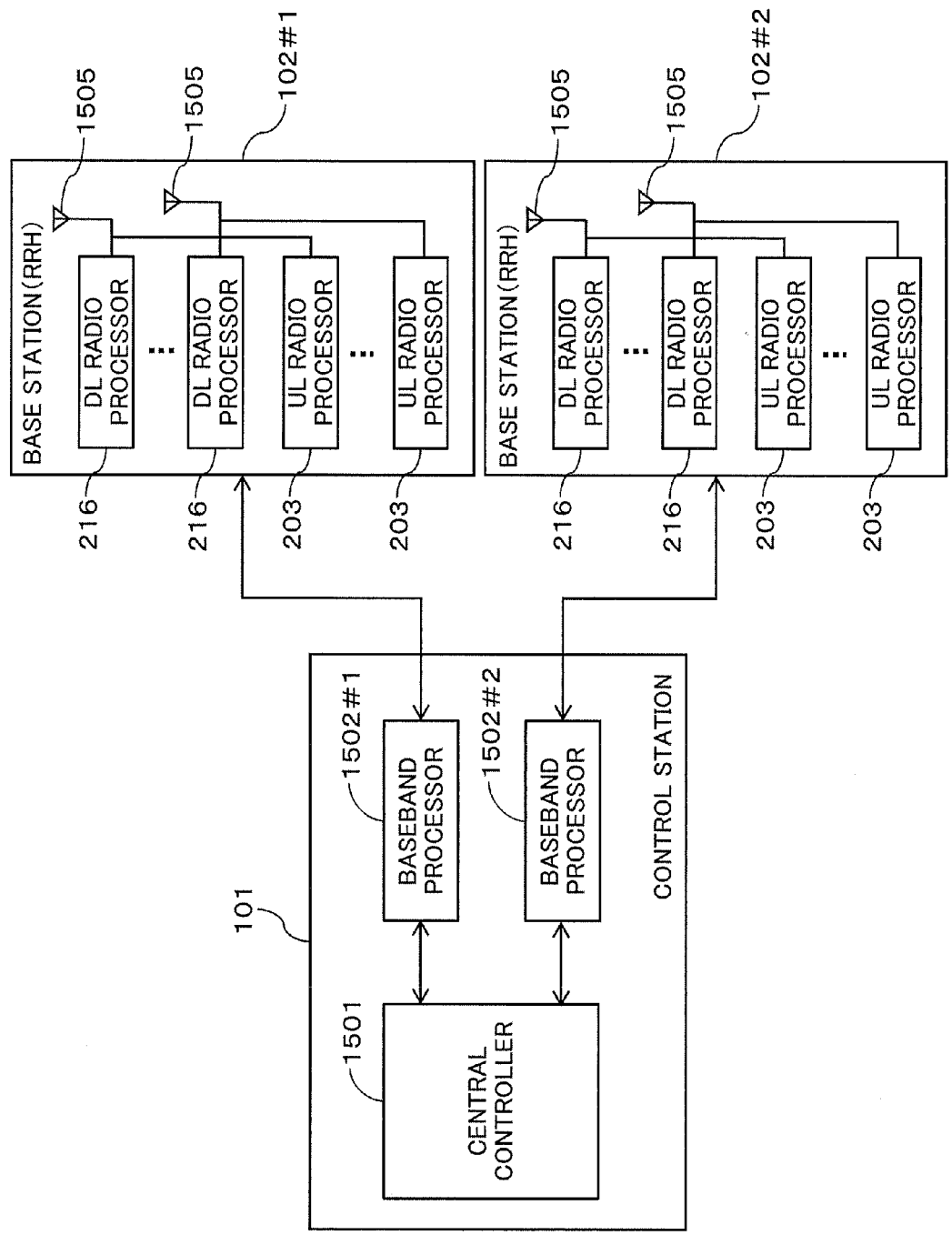
FIG. 16 is a functional block diagram of a base station apparatus of a radio communication system according to Embodiment 4.

FIG. 16 is a functional block diagram of the control station 101 and the base stations 102#1 and 102#2. The control station 101 includes a central controller 1501, and baseband processors 1502#1 and 1502#2 respectively corresponding to the base stations 102#1 and 102#2. Each of the base stations 102#1 and 102#2 includes a UL radio processor 203 and a DL radio processor 216 in correspondence with each antenna 1505.

Figure 17:
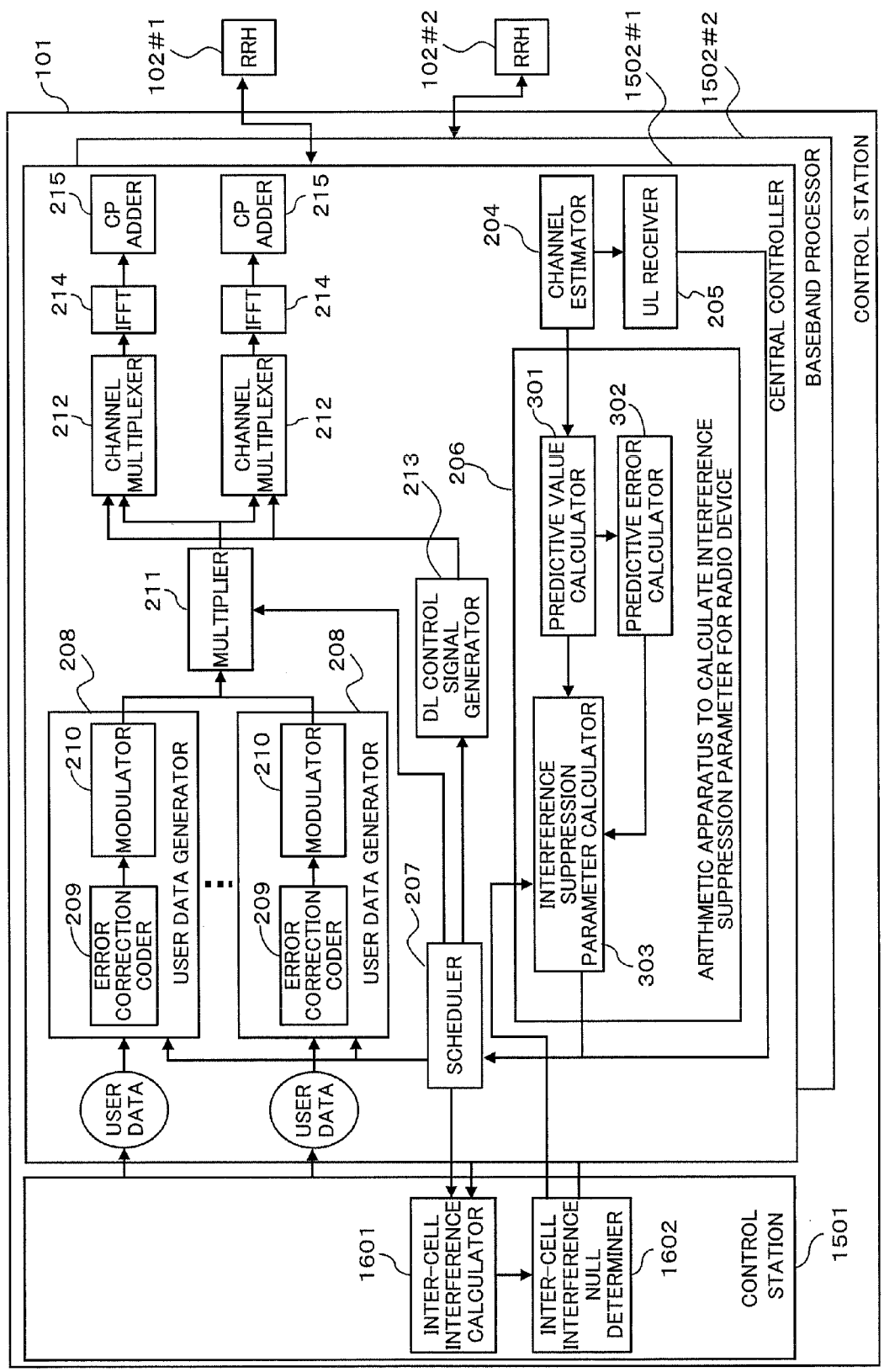
FIG. 17 is a functional block diagram of the base station apparatus of the radio communication system according to Embodiment 4.

FIG. 17 is a more detailed functional block diagram of the control station 101.

The central controller 1501 includes an inter-cell interference calculator 1601 and an inter-cell interference null determiner 1602.

Each of the baseband processors 1502#1 and 1502#2 includes a channel estimator 204, a UL receiver 205, an arithmetic apparatus 206 to calculate an interference suppression parameter for a radio device, a scheduler 207, and a user data generator 208. In addition, each of the baseband processors 1502#1 and 1502#2 includes a multiplier 211, a channel multiplexer 212, a DL control signal generator 213, an IFFT 214, and a CP adder 215.

Accordingly, each of the baseband processors 1502#1 and 1502#2 has a configuration in which the antennas 202, the UL radio processors 203, and the DL radio processors 216 are moved from the base station apparatus 201 according to Embodiments 1 to 3 to the base stations 102#1 and 102#2.

Here, the scheduler 207 of each of the baseband processors 1502#1 and 1502#2 outputs information of UEs positioned in the radio areas 103#1 and 103#2 to the inter-cell interference calculator 1601 of the central controller 1501. Then, the inter-cell interference calculator 1601 calculates inter-cell interference power based on the output of the scheduler 207 of each of the baseband processors 1502#1 and 1502#2.

The inter-cell interference calculator 1601, based on the output of the scheduler 207 of each of the baseband processors 1502#1 and 1502#2, calculates interference power received by each UE from an adjacent radio area.

The inter-cell interference null determiner 1602, based on the inter-cell interference power calculated by the inter-cell interference calculator 1601, determines a base station to direct a null toward a certain UE. For example, the interference power calculated by the inter-cell interference calculator 1601 is sorted in the descending order, priority is given to a UE having higher interference power, and a base station of an adjacent radio area is determined to direct a null toward the UE. A result of the determination is output to the interference suppression parameter calculator 303 of each of the baseband processors 1502#1 and 1502#2.

The interference suppression parameter calculator 303 of the baseband processor 1502#1, based on the result of the determination output from the inter-cell interference null determiner 1602, calculates a parameter to be orthogonal to the predictive value calculated by the predictive value calculator 301 and the principal component of the predictive error calculated by the predictive error calculator 302. Similarly, a parameter is calculated to be orthogonal to the predictive value calculated by the predictive value calculator 301 of the baseband processor 1502#2 and the principal component of the predictive error calculated by the predictive error calculator 302.

Figure 18:
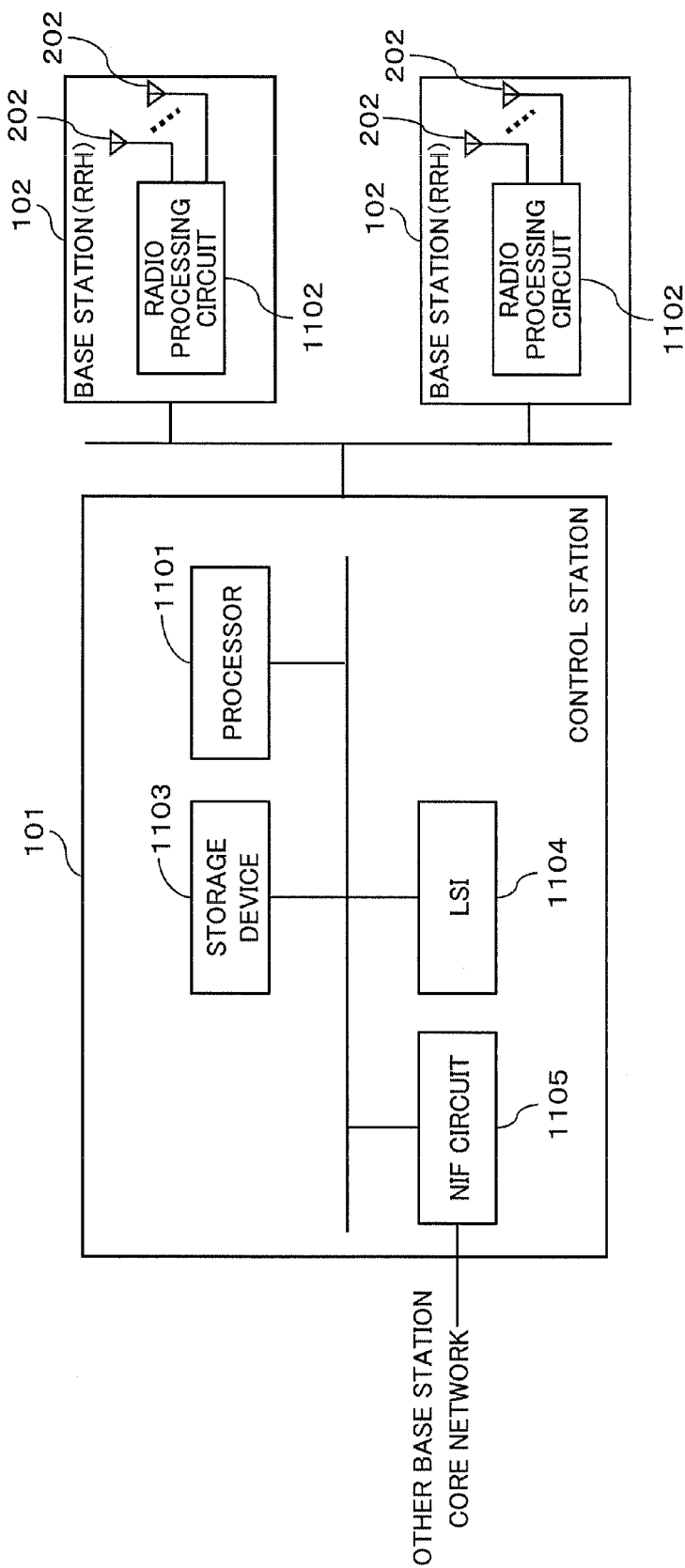
FIG. 18 is a hardware configuration diagram of the base station apparatus of the radio communication system according to Embodiment 4.

FIG. 18 is a hardware configuration diagram of the control station and the base station. The control station 101 includes a processor 1101, a storage device 1103, an LSI 1104, and an NIF circuit 1105. Each of the base stations 102#1 and 102#2 includes a radio processing circuit 1102 and antennas 202. Thus, a configuration is formed in which the radio processing circuit 1102 and the antennas are moved from the base station apparatus 201 illustrated in FIG. 11 to the base station (RRH) 102.

As above, Embodiments 1 to 3 can be also applied to the cooperative beam-forming.

Embodiment 5

In Embodiments 1 to 4, the arithmetic apparatus 206 to calculate an interference suppression parameter for a radio device is arranged in the base station apparatus 201. However, the arithmetic apparatus 206 to calculate an interference suppression parameter for a radio device is not limited to being arranged in the base station apparatus 201, but, for example, the predictive value calculator 301 and the predictive error calculator 302 may be arranged in the UE 104. In other words, the predictive value calculator 301, the predictive error calculator 302, the interference suppression parameter calculator 303, and the null principal component number determiner 1301 may be arranged in one of the control station 101, the base station 102, and the UE 104 in a distributed manner. Accordingly, the calculation performed by the predictive value calculator 301 and the predictive error calculator 302 can be performed inside the UE 104, and the load of the calculation in the base station apparatus 201 can be distributed to the UE 104.

Figure 19:
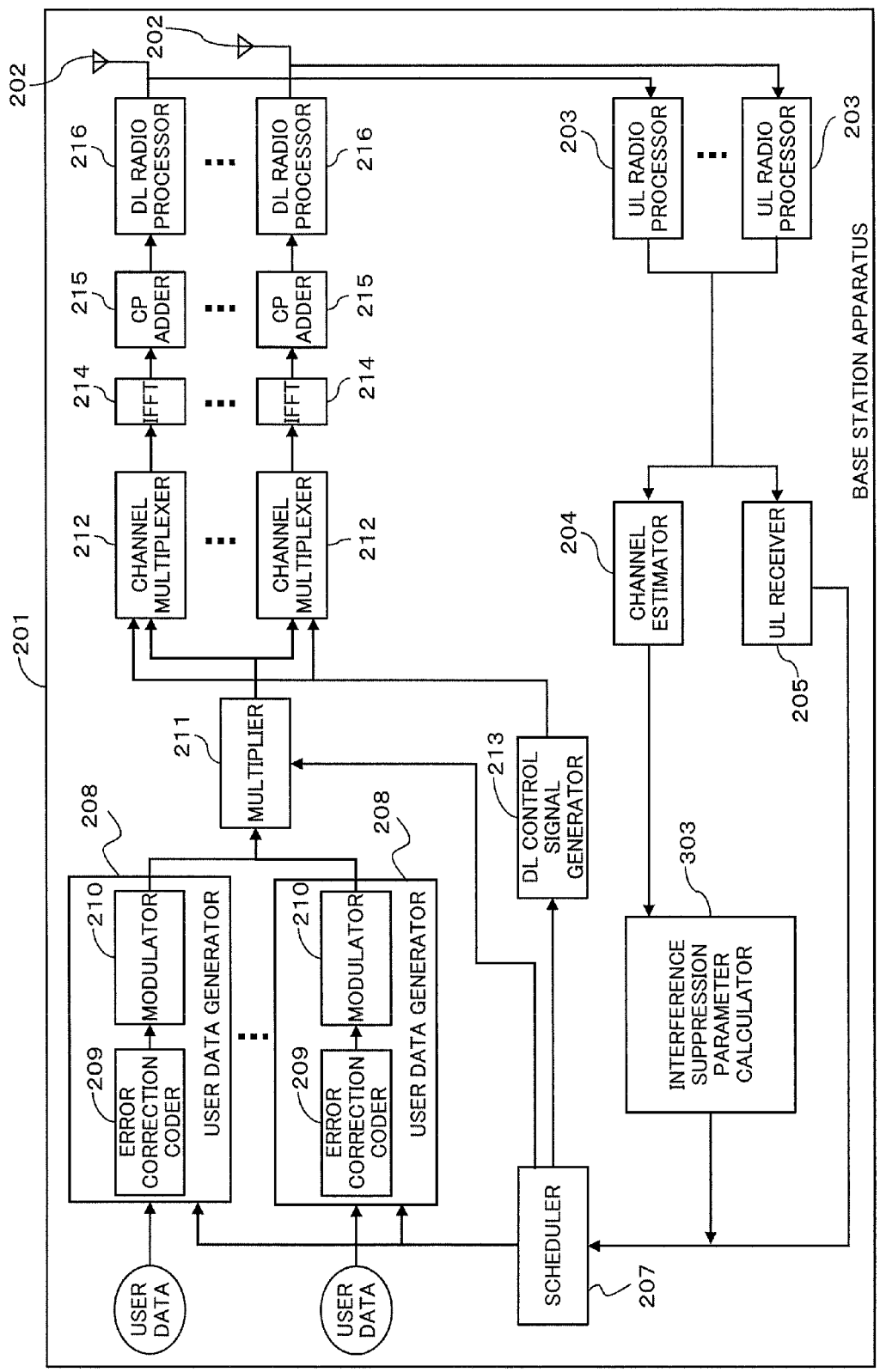
FIG. 19 is a functional block diagram of a base station apparatus of a radio communication system according to Embodiment 5.
Figure 20:
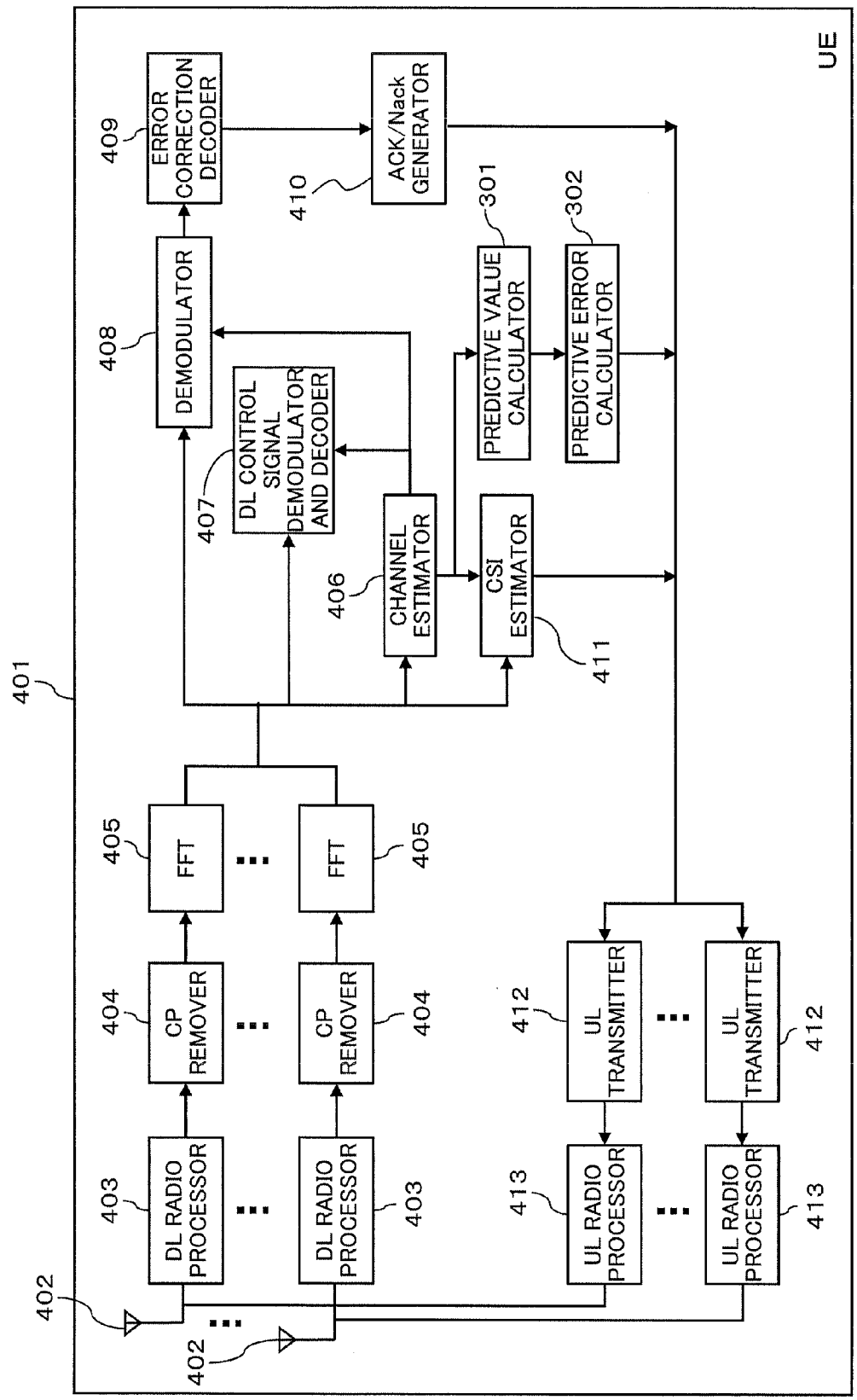
FIG. 20 is a functional block diagram of a UE according to Embodiment 5.

FIG. 19 is a functional block diagram of the base station apparatus 201 according to this embodiment, and FIG. 20 is a functional block diagram of the UE 104 according to this embodiment. Compared to the functional blocks of the base station apparatus 201 and the UE 104 according to Embodiments 1 to 4, in this embodiment, the base station apparatus 201 includes the interference suppression parameter calculator 303 of the arithmetic apparatus 206 to calculate an interference suppression parameter for a radio device. In addition, the UE 104 includes the predictive value calculator 301 and the predictive error calculator 302 of the arithmetic apparatus 206 to calculate an interference suppression parameter for a radio device.

In addition, in this embodiment corresponding to Embodiment 2 in which the arithmetic apparatus 206 to calculate an interference suppression parameter for a radio device includes the null principal component number determiner 1301, the base station apparatus 201 may include the null principal component number determiner 1301.

FIG. 21 is a sequence diagram of communication between the base station 102 and the UEs 104#1 and 104#2 according to this embodiment.

In Step S1901, the UE 104#1 (UE#1) performs a channel estimation by using the channel estimator 406. In Step S1902, UE#1 calculates a predictive value of the channel state by using the predictive value calculator 301. In Step S1903, UE#1 calculates a predictive error in the predictive value by using the predictive error calculator 302. Thereafter, UE#1, in Step S1907, transmits the channel estimation and the predictive value and the predictive error that have been calculated to the base station 102.

Similarly, in Step S1904, UE#2 performs a channel estimation by using the channel estimator 406. In Step S1905, UE#2 calculates a predictive value of the channel state by using the predictive value calculator 301. In Step S1906, UE#2 calculates a predictive error of the predictive value by using the predictive error calculator 302. Thereafter, UE#2, in Step S1908, transmits the channel estimation and the predictive value and the predictive error that have been calculated to the base station 102.

When the channel estimation and the predictive value and the predictive error that have been calculated are received from each of UE#1 and UE#2, the base station 102 calculates an interference suppression parameter by using the interference suppression parameter calculator 303 in Step S1909. A result of the calculation is output to the scheduler 207, and the scheduler performs scheduling in Step S1910. Based on the result of the scheduling, a baseband signal and a radio signal are generated, and the base station 102 transmits the radio signal to UE#1 and UE#2 in Steps S1911 and S1912.

As above, according to Embodiment 5, the load of calculation in the base station can be distributed to the UE 104.

In Embodiment 5 described above, an example has been described in which the interference suppression parameter calculator 303 is arranged in the base station apparatus 201, and the predictive value calculator 301 and the predictive error calculator 302 are arranged in the UE 401. In addition, there is also a form in which the interference suppression parameter calculator 303 and the predictive value calculator 301 are arranged in the base station apparatus 201, and the predictive error calculator 302 is arranged in the UE 401. Furthermore, the null principal component number determiner 1301 may be arranged not in the base station apparatus 201 but in the UE 401.

In addition, the interference suppression parameter calculator 303, the predictive value calculator 301, and the predictive error calculator 302 may be arranged in the base station apparatus 201 or the UE 401.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An arithmetic apparatus to calculate an interference suppression parameter for a radio device, the arithmetic apparatus comprising:
    a predictive value calculator configured to calculate a predictive value for a radio communication channel between radio devices;
    a predictive error calculator configured to calculate a predictive error in the radio communication channel based on the predictive value; and
    an interference suppression parameter calculator configured to calculate an interference suppression parameter available to suppress an interference in the radio communication channel, the interference suppression parameter being orthogonal to the predictive value and the predictive error in a vector space.

2. The arithmetic apparatus according to claim 1, wherein the predictive error calculator is configured to acquire errors between the predictive value and an estimated value for the radio communication channel in a time series and perform a principal component analysis on the errors to obtain a principal component as the predictive error.

3. The arithmetic apparatus according to claim 2, wherein the predictive error calculator is configured to perform an eigenvalue decomposition on a covariance matrix of the errors to obtain an eigenvector as the predictive error.

4. The arithmetic apparatus according to claim 3, wherein the predictive error calculator is configured to acquire an eigenvector corresponding to eigenvalues equal to or more than a predetermined threshold among eigenvalues of the covariance matrix of the errors as the predictive error.

5. The arithmetic apparatus according to claim 1, wherein the predictive value calculator is configured to acquire estimated values for the radio communication channel in a time series and weight the estimated values to acquire the predictive value for the radio communication channel.

6. The arithmetic apparatus according to claim 1, wherein the radio communication channel is one of radio communication channels between a plurality of base stations which forms different radio areas and a plurality of radio devices positioned in the different radio areas.

7. The arithmetic apparatus according to claim 1, wherein the radio communication channel is defined for each transmission layer of radio communication.

8. A base station apparatus that communicates with a radio communication terminal device through a radio communication channel, the base station apparatus comprising:
    a storage device; and
    a processor configured to execute programs stored in the storage device configured to:
    calculate a predictive value for the radio communication channel;
    calculate a predictive error in the radio communication channel based on the predictive value; and
    calculate an interference suppression parameter available to suppress an interference in the radio communication channel, the interference suppression parameter being orthogonal to the predictive value and the predictive error in a vector space.

9. A radio terminal device that communicates with a base station apparatus through a radio communication channel, the radio communication terminal device comprising:
    a processor configured to:
    calculate a predictive value for the radio communication channel; and
    calculate a predictive error in the radio communication channel based on the predictive value; and
    a transmitter configured to transmit the predictive value and the predictive error to the base station apparatus to enable the base station apparatus to communicate with the radio communication terminal device by using an interference suppression parameter available to suppress an interference in the radio communication channel, the interference suppression parameter being calculated by the base station apparatus and being orthogonal to the predictive value and the predictive error for the radio communication channel in a vector space.

* * * * *